United States Patent [19]
Onuki

[11] Patent Number: 5,845,156
[45] Date of Patent: *Dec. 1, 1998

[54] IMAGE STABILIZING DEVICE

[75] Inventor: Ichiro Onuki, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 917,855

[22] Filed: Aug. 27, 1997

Related U.S. Application Data

[63] Continuation of Ser. No. 353,340, Dec. 5, 1994, abandoned, which is a continuation of Ser. No. 940,400, Sep. 3, 1992, abandoned.

[30] Foreign Application Priority Data

Sep. 6, 1991 [JP] Japan .................................. 3-254238
Sep. 6, 1991 [JP] Japan .................................. 3-254239
Sep. 6, 1991 [JP] Japan .................................. 3-254240

[51] Int. Cl.$^6$ .................................................. G03B 17/00
[52] U.S. Cl. .............................. 396/52; 396/55; 348/208
[58] Field of Search .............................. 396/52, 53, 54, 396/55; 348/208

[56] References Cited

U.S. PATENT DOCUMENTS

| | | | |
|---|---|---|---|
| 4,462,671 | 7/1984 | Suzuki et al. | 354/430 |
| 4,970,540 | 11/1990 | Vasey et al. | 354/202 |
| 5,020,369 | 6/1991 | Washisu et al. | 354/202 |
| 5,099,694 | 3/1992 | Sumio et al. | 73/654 |
| 5,117,246 | 5/1992 | Takahashi | 354/430 X |
| 5,122,908 | 6/1992 | Sporer | 359/557 |
| 5,153,633 | 10/1992 | Otani | 354/430 |
| 5,155,520 | 10/1992 | Nagasaki | 354/43 |
| 5,243,462 | 9/1993 | Kobayashi et al. | 359/557 |

FOREIGN PATENT DOCUMENTS

| | | |
|---|---|---|
| 3628480 | 3/1987 | Germany . |
| 61-160824 | 7/1986 | Japan . |
| 2-59718 | 2/1990 | Japan . |
| 2-165058 | 6/1990 | Japan . |
| 4-86735 | 3/1992 | Japan . |
| 676638 | 2/1991 | Switzerland . |

*Primary Examiner*—Russell E. Adams
*Attorney, Agent, or Firm*—Fitzpatrick, Cella, Harper & Scinto

[57] ABSTRACT

An image stabilizing means includes a limiting means for determining an upper limit value of a driving deviation of a correction optical mechanism according to the position of a zooming optical group or a focusing group, and limiting the deviation of the correction optical mechanism based on the upper limit value.

53 Claims, 27 Drawing Sheets

FIG.8

| f | Sd(f.β) | df | dIMF | θf |
|---|---|---|---|---|
| 100mm | 2.5 | ± 1.3mm | ± 3.2mm | ± 0.032 rad |
| 170mm | 3 | ± 1.5mm | ± 4.6mm | ± 0.027 rad |
| 300mm | 3.5 | ± 2mm | ± 7mm | ± 0.023 rad |

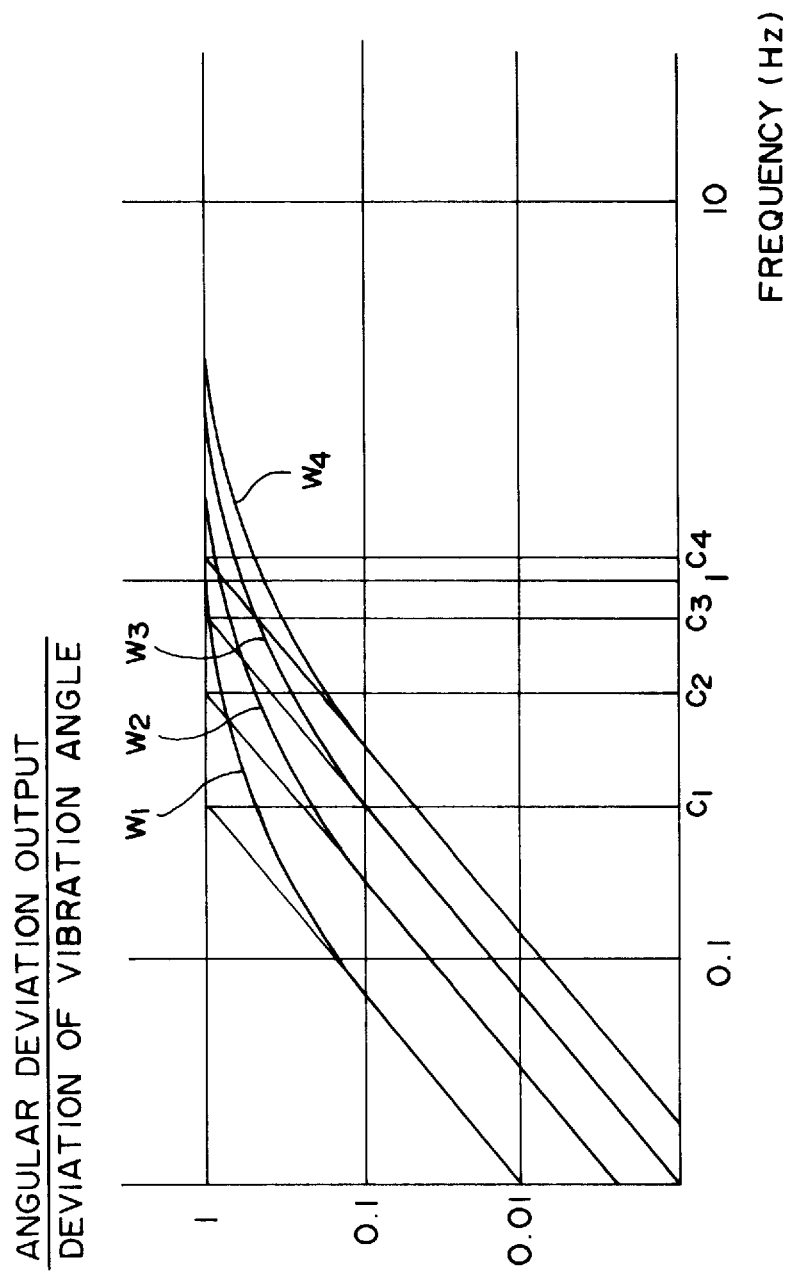

F I G. 27

| f | Sd (f, β) | dL max | dIM max | θ max |
|---|---|---|---|---|
| 100 mm | 2.5 | ±2 mm | ±5 mm | ±0.050 rad |
| 170 mm | 3 | ±2 mm | ±6 mm | ±0.035 rad |
| 300 mm | 3.5 | ±2 mm | ±7 mm | ±0.023 rad |

IMAGE STABILIZING DEVICE

This application is a continuation of application Ser. No. 08/353,340 filed Dec. 5, 1994, which is a continuation of application Ser. No. 07/940,400 filed Sep. 3, 1992, both now abandoned.

BACKGROUND OF THE INVENTION

1. Field of the Invention

The present invention relates to an image stabilizing apparatus comprising a vibration detection means for detecting a vibration, an image stabilizing means for performing an image stabilizing operation to correct an image blur by deflecting a light beam by moving an optical member arranged in an optical path, and a control means for performing driving control of the image stabilizing means according to the output from the vibration detection means.

2. Description of the Related Art

Conventionally, various image stabilizing apparatuses for cameras have been proposed. For example, an apparatus using a variable vertical angle prism is proposed in Japanese Laid-Open Patent Application No. 2-59718, and the like. In the variable vertical angle prism, a transparent liquid is sealed between two plane-parallel glass plates, and the relative angle between the two glass plates is changed to obtain a prism effect, thereby deflecting a light beam. In this apparatus, the variable vertical angle prism is added to a photographing optical system, and an image blur on the focal plane caused by a vibration of the photographing optical system is eliminated by the light beam deflection effect of the variable vertical angle prism.

In general, the variable vertical angle prism is arranged in front of the photographing optical system. In this case, the coefficient of the prism driving angle with respect to the vibration amount of the photographing optical system is constant independently of the characteristics of the photographing optical system. That is, even if the photographing optical system corresponds to a zoom lens, the control constant for image stabilization need not be changed. However, in this method, since the effective aperture of the variable vertical angle prism must be increased, the apparatus undesirably becomes large in size.

Thus, the present applicant proposes an apparatus for eliminating an image blur by moving an image on the focal plane by deviating some components of the photographing optical system in a direction perpendicular to the optical axis in German Laid-Open Patent Application No. 3628480. FIG. 26 shows this image stabilization principle.

In FIG. 26, a photographing optical system 1 includes a zooming system, a focusing system, and a correction optical system 2 for performing image stabilization. When the correction optical system 2 is deviated by $d_L$, an image deviates by $d_{IM}$. An angle deviation detector 3 detects and outputs a vibration angle deviation θ of the photographing optical system 1. A coefficient converter 4 converts the vibration angle deviation θ into a deviation signal d necessary for eliminating an image blur.

An actuator 5 controls the driving operation of the correction optical system 2 according to the deviation signal d. A position detection sensor 6 detects an actual deviation $d_L$ of the correction optical system 2. The signal from the sensor 6 is fed back to an input system of the actuator 5 through an operational amplifier 7, so that the correction optical system 2 can accurately trace the deviation signal d.

The relationship among the vibration angle deviation θ of the photographing optical system 1, the deviation $d_L$ of the correction optical system 2, and the image moving amount (deviation) $d_{IM}$ will be described below.

When the focal length of the photographing optical system 1 is represented by f, and its photographing magnification is represented by β, the image deviation $d_{IM}$ when the photographing optical system 1 causes an angle vibration θ [rad] to have the near-side principal point as the center is given by:

$$d_{IM} = f(1+\beta)\cdot\theta \qquad (1)$$

On the other hand, if the ratio of the image deviation $d_{IM}$ to the deviation $d_L$ of the correction optical system 2 is defined as a decentering sensitivity $S_d$, the image deviation $d_{IM}$ is given by:

$$d_{Im} = S_d \cdot d_L \qquad (2)$$

Since the decentering sensitivity $S_d$ is a function of the focal length f and the photographing magnification β, the decentering sensitivity $S_d$ can be expressed as:

$$S_d = S_d(f, \beta) \qquad (3)$$

In the image stabilization principle, since the image blur (equation (1)) caused by an angle vibration of the photographing optical system 1 is eliminated by the image deviation (equation (2)) based on the lens deviation, (1)=(2) and equation (3) lead to:

$$d = d_L = (d_{IM}/S_d) = \{f\cdot(1+\beta)\cdot\theta\}/\{S_d(f,\beta)\} \qquad (4)$$
$$= k\theta$$

Or $$\theta = \{S_d(f,\beta)\cdot d_L\}/\{f\cdot(1+\beta)\} = d_L/k \qquad (5)$$

However, the prior art poses the following problems.

More specifically, although the values "f", "(1+β)", and "$S_d(f, \beta)$" change upon zooming or focusing, a maximum possible deviation $d_L$max of the correction optical system 2 is invariant. Thus, according to equation (5), a possible image stabilization angle θmax undesirably changes depending on the focal length f. In general, the decentering sensitivity $S_d(f, \beta)$ is increased upon zooming at the telephoto-side, but has a smaller change rate than that of the focal length f. For this reason, the possible image stabilization angle θmax at the wide-side becomes larger than that at the telephoto-side. FIG. 27 shows this state. FIG. 27 shows the values of the decentering sensitivity $S_d$ with respect to the focal length f.

In FIG. 27, $d_{IM}$max is the maximum image deviation. In the above description, the decentering sensitivity $S_d$ is a function of the focal length f and the photographing magnification β. In this case, although a change in decentering sensitivity $S_d$ with respect to a change in focal length f is large, the change in decentering sensitivity $S_d$ with respect to a change in photographing magnification β is relatively small. For this reason, FIG. 27 pays attention to only the change in decentering sensitivity $S_d$ with respect to a change in focal length f, and the photographing magnification β is assumed to be constant.

In this case, the following problems are posed.

1) When a photographer holds a camera with a zoom lens, the camera shake or vibration amplitude by the photographer is almost constant independently of the focal length. On the other hand, a possible image stabilization range must be larger than the camera vibration amplitude. However, if this range is too large, a photographer feels uneasy in a panning operation, and this results in a camera which is not easy to use.

2) The fact that the possible image stabilization range is large at the wide-side means that the aberration of the optical system is also increased at the wide-side. On the other hand, since an image blur deviation per unit vibration angle is small at the wide-side, image deterioration caused by a camera vibration at the wide-side is smaller than that at the telephoto-side. When a photographer performs a panning operation even at the wide-side, the image stabilizing apparatus may use the maximum region of the image stabilization range in response to the panning operation. When exposure is performed at that time, image deterioration is caused by the aberration even though camera vibration stabilization can be accurately performed.

If the object of the image stabilizing apparatus is limited to suppression of an unintentional camera vibration by a photographer, it is desirable that the vibration suppression frequency band of the apparatus is as wide as possible. However, in a normal photographing apparatus, an intentional vibration by a photographer, i.e., panning and framing change operations are performed in addition to an unintentional camera vibration. An image stabilizing operation should not be performed for such operations.

For this purpose, a proposal for discriminating an intentional operation of a photographer from an unintentional camera vibration, and varying vibration suppression characteristics of the image stabilizing apparatus has already been made. For example, in Japanese Laid-Open Patent Application No. 4-86735 proposed by the present applicant, the vibration detection characteristics (especially, the vibration detection frequency band) of an angle deviation detector for detecting an angle deviation of a vibration caused on a camera are changed according to the angle deviation output from the angle deviation detector. More specifically, the amplitude (angle deviation) of a normal camera vibration falls within a predetermined range, while an intentional operation such as a panning operation causes a considerably large angle deviation. For this reason, whether or not an intentional operation is performed is discriminated according to the magnitude of the angle deviation, and optimal vibration detection characteristics, i.e., image stabilization characteristics of the sensor are obtained accordingly.

In U.S. Pat. No. 5,099,694, a combination of an accelerometer and an integrator is used as the vibration detection sensor, and the integration time constant of the integrator is changed according to the output value from the integrator, thus obtaining the same effect as described above.

In Swiss Patent No. 676,638 by the present applicant, the vibration signal input gain to an image stabilizing circuit is changed according to the control deviation of the image stabilizing correction optical system, thereby preventing a deviation from being erroneously saturated when the control deviation of the image stabilizing correction optical system becomes excessive by, e.g., a panning operation.

However, the above-mentioned prior arts respectively suffer from the following problems.

In Japanese Laid-Open Patent Application No. 4-86735 and U.S. Pat. No. 5,099,694, since the image stabilization characteristics are switched according to the vibration angle deviation, the apparatus can respond to a panning operation having a proper magnitude or speed, but has poor response characteristics with respect to an abrupt panning operation that causes a driving deviation of the image stabilizing correction optical system to completely saturate. More specifically, when an excessive panning operation is performed, since the image stabilizing function is completely disabled, return control to a position near the origin of the vibration detection signal is most preferentially performed. In addition, when the image stabilizing correction optical system is assembled in the zoom lens, since the possible image stabilization range varies upon zooming, the return control of the vibration detection signal to the origin must be interlocked with the zooming operation. However, the above-mentioned proposals have no arrangement for performing this control.

In Swiss Patent No. 676,638, when the control deviation of the image stabilizing correction optical system reaches a predetermined value, the image stabilization characteristics are changed. Like in the above-mentioned prior arts, when the image stabilizing correction optical system is assembled in the zoom lens, a value obtained by converting a predetermined deviation of the image stabilizing correction optical system into an angle in the image stabilization range at the object side varies upon zooming. More specifically, when the prior art is applied to the zoom lens, a switching point for switching the image stabilization characteristics upon detection of, e.g., a panning operation changes upon zooming. However, the amplitude of the camera vibration angle is almost constant independently of the focal length of the photographing optical system. Therefore, in this prior art, the image stabilization characteristics cannot be accurately changed when a panning operation is performed in a state wherein only a camera vibration occurs.

SUMMARY OF THE INVENTION

One aspect of the invention is to arrange, in an image stabilizing means, a limiting means for determining a limit value of a driving deviation of a correction optical mechanism according to the position of a zooming optical group or a focusing group, and limiting the deviation of the correction optical mechanism based on the limit value. When an image stabilization range changes upon, e.g., zooming, the deviation of the correction optical mechanism, i.e., the image stabilization range is limited according to the change in image stabilization range so as to prevent the image stabilization range at the wide-side from becoming too wide, and to prevent the image stabilization range from including a region with a large aberration. Thus, a camera can obtain good operability without impairing panning operability, and can provide an image free from deterioration.

Furthermore, one aspect of the invention is to arrange a characteristic varying means for varying image stabilization characteristics of an image stabilizing apparatus, and a control means for controlling the image stabilization characteristics varied by the characteristic varying means by comparing a signal from a vibration detection means with a plurality of different threshold values. Thus, the operability of an intentional operation such as a panning operation can be improved without impairing camera vibration stabilizing performance, and even when the possible image stabilization range varies, the same effect can be expected.

Moreover, one aspect of the invention is to provide an image stabilizing apparatus having a correction optical mechanism or system including a plurality of driving means which are independently driven in different directions so as to correct a two-dimensional image blur on a focal plane, comprising a control means for, when a deviation of the correction optical system by the plurality of driving means reaches a predetermined relationship, limiting driving deviations in the different directions, and a driving control means for, when the deviation of the correction optical system by the plurality of driving means reaches a first predetermined relationship, driving the plurality of driving means according to a signal obtained by synthesizing corresponding driving control signals in a second predetermined relationship. Thus, when the deviation of the correction optical system by the plurality of driving means for driving the correction optical system in different directions reaches the first predetermined relationship, the deviation of the correction optical system is limited, or the driving means are driven according to a signal obtained by synthesizing corresponding driving control signals in the second predetermined relationship, so that the correction optical system can move (deviate) within only a predetermined range. Therefore, a lens barrel can be prevented from becoming unnecessarily large in size, and an excessive aberration can be prevented. In addition, the operability of panning and framing change operations can be improved.

BRIEF DESCRIPTION OF THE DRAWINGS

FIG. 8 is a table showing the relationship among a focal length, an image stabilization angle upper limit value, a deviation upper limit value of the correction optical system, and the like in the first embodiment of the present invention;

FIG. 13B is a graph showing the vibration detection characteristics upon selection of four different amplitude rates shown in FIG. 13A;

FIG. 27 is a table showing decentering sensitivity, a maximum deviation, a maximum image deviation, and a possible image stabilization angle at respective zoom positions of an optical system arranged in the conventional apparatus.

DETAILED DESCRIPTION OF THE PREFERRED EMBODIMENTS

FIGS. 1 to 5 are views according to the first embodiment of the present invention.

Figure 2:
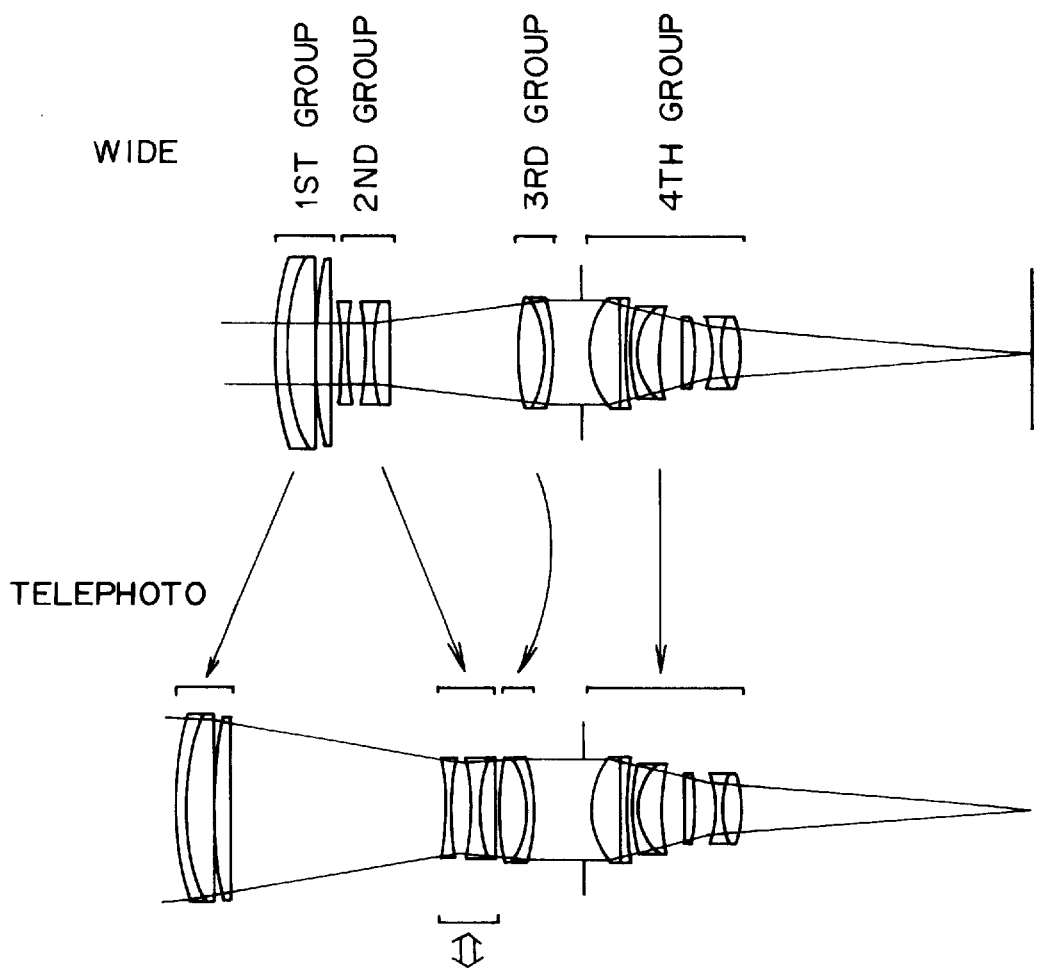
FIG. 2 is a view showing an imaging optical system used in each embodiment of the present invention.
Figure 3:
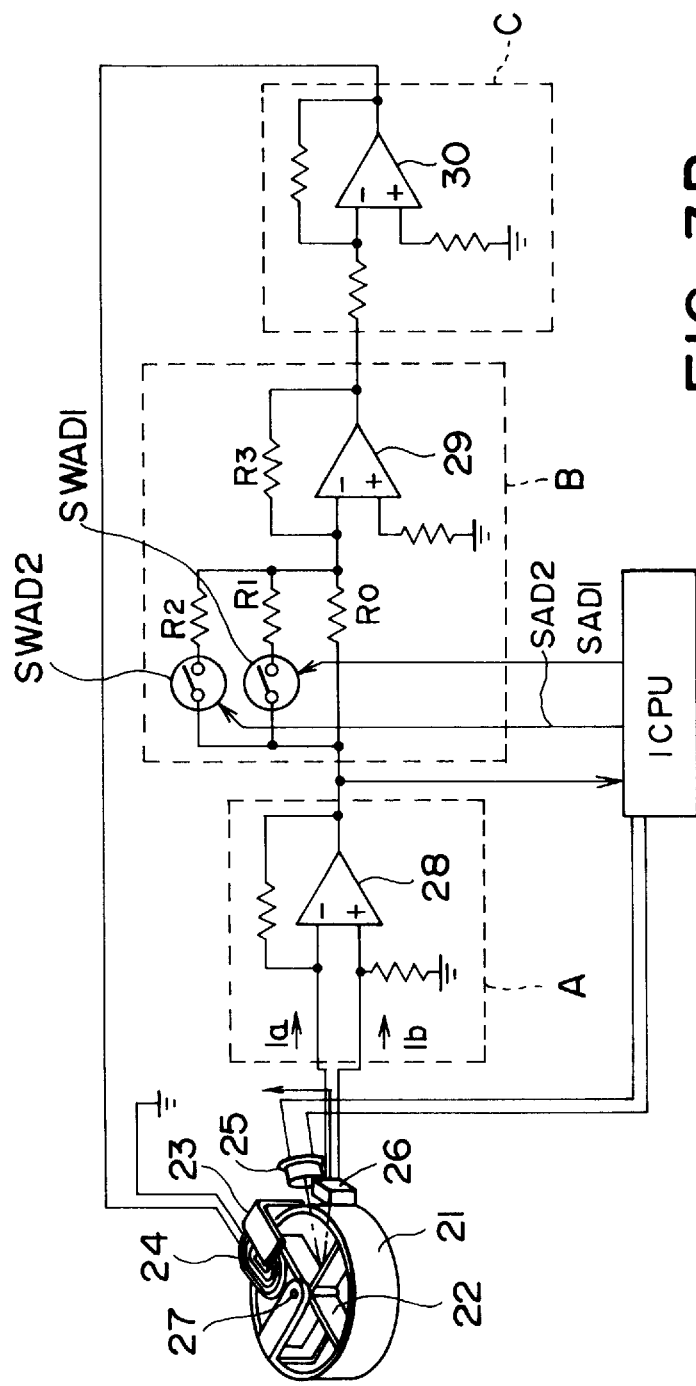
FIGS. 3A and 3B are a diagram showing mechanical and electrical arrangements of an angle deviation detector according to the first embodiment of the present invention, and a table showing amplitude rates, respectively.

FIG. 2 shows an imaging optical system used in the present invention. The imaging optical system comprises a ×3 zoom lens having a focal length ranging between 100 mm and 300 mm. The upper illustration in FIG. 2 shows the lens arrangement at the wide-end (f=100 mm), and the lower illustration shows the lens arrangement at the telephoto-end (f=300 mm).

The imaging optical system consists of four groups. Upon zooming, the fourth group is fixed, and the first, second, and third groups are moved. Upon focusing, the first group is moved. When the second group is deviated in a direction perpendicular to the optical axis, an image on the focal plane is deviated to perform image stabilization.

The characteristics associated with image stabilization of the imaging optical system are as shown in FIG. 27.

When the object distance is infinite, the decentering sensitivities $S_A(f, \beta)$ at f=100 mm and 300 mm are respectively "2.5" and "3.5" (see FIG. 27). On the other hand, the maximum possible deviation $d_L$max of the correction optical system (second group) is determined by the structure of a support mechanism portion of the optical system, and is "±2 mm" irrespective of the focal length f. The maximum image deviations $d_{IM}$max at the above-mentioned focal lengths are therefore respectively "±5 mm" and "±7 mm", and the corresponding possible image stabilization angles θmax are respectively "±0.050 rad" and "±0.023 rad" from equation ①. That is, as can be understood from the above description, the possible image stabilization amount at the wide-side is twice that at the telephoto-side upon comparison between the possible image stabilization angles.

Therefore, the gist of the present invention is to properly adjust the possible image stabilization amount.

Figure 1:
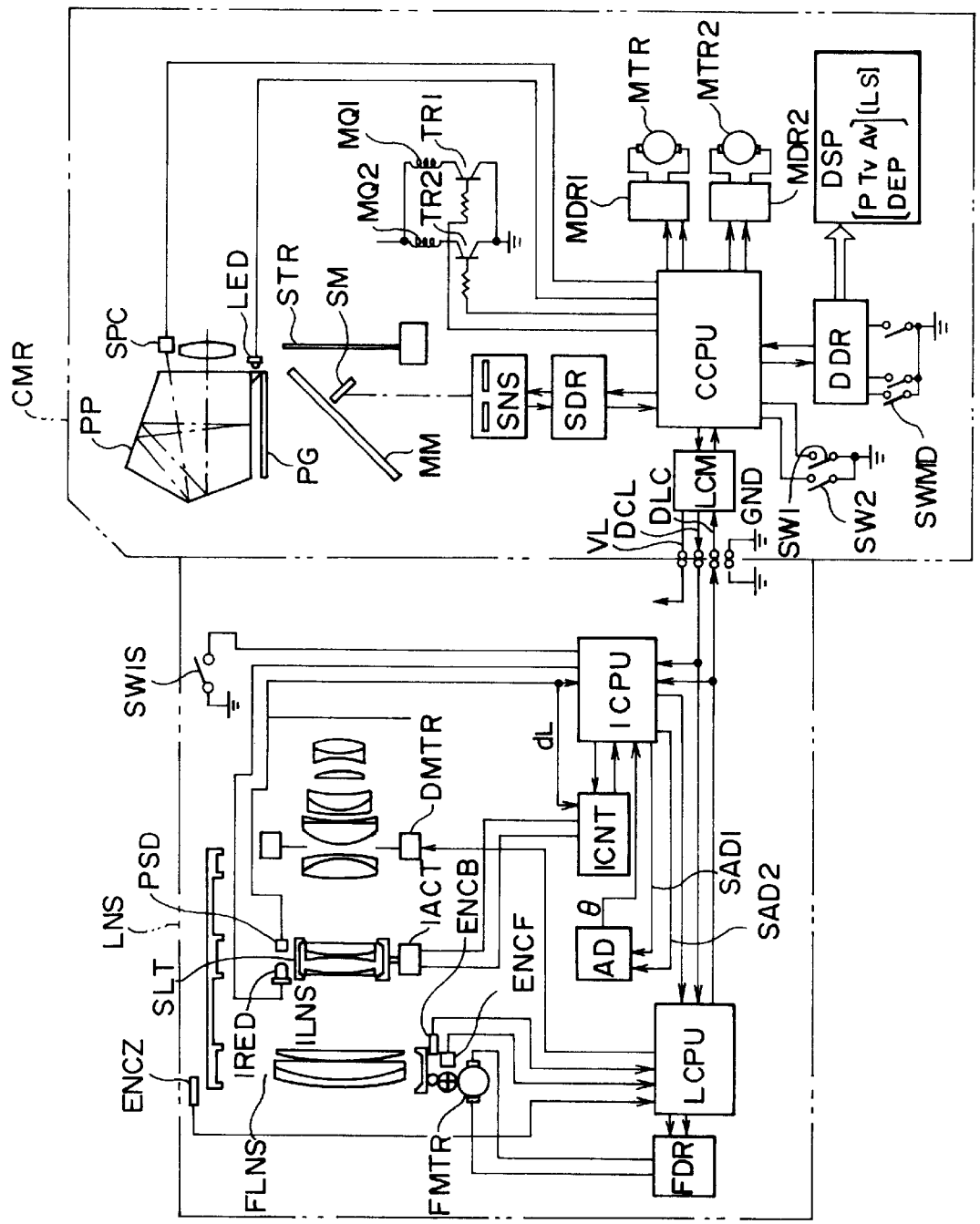
FIG. 1 is a schematic diagram showing an arrangement of a camera comprising an apparatus according to the first embodiment of the present invention.

FIG. 1 is a diagram showing a main part according to the first embodiment of the present invention.

In FIG. 1, an exchangeable lens LNS is detachably attached to a camera main body CMR.

The arrangement of the camera main body CMR will be described below.

A camera microcomputer CCPU is a one-chip microcomputer having a ROM, a RAM, and an A/D conversion function. The camera microcomputer CCPU performs a series of operations of the camera such as automatic exposure control, automatic focusing, a film winding operation, and the like according to a sequence program of the camera stored in the ROM. For this purpose, the camera microcomputer CCPU communicates with the peripheral circuits in the camera main body CMR and the lens to control the operations of the respective circuits and the lens.

A lens communication buffer circuit LCM supplies a power supply voltage to the lens LNS through a power supply line VL, and serves as a lens communication buffer for outputs supplied from the camera main body CMR to the lens LNS through a signal line DCL and outputs supplied from the lens LNS to the camera main body CMR through a signal line DLC.

A focus detection line sensor (to be simply referred to as a sensor hereinafter) SNS comprising, e.g., a CCD is driven by a driver SDR according to a command from the camera microcomputer CCPU. The driver SDR fetches an image signal from the sensor SNS, amplifies the fetched image signal, and supplies the amplified signal to the camera microcomputer CCPU.

Light from the lens LNS is incident on a photometry sensor SPC through a main mirror MM, a focusing screen PG, and a pentagonal prism PP, and the output signal from the sensor SPC is input to the camera microcomputer CCPU. The input signal is used in automatic exposure control (AE) according to a predetermined program.

A switch detection & display circuit DDR switches a display on a display member DSP of the camera on the basis of data supplied from the camera microcomputer CCPU, and informs ON/OFF states of various operation members (SWMD) of the camera to the camera microcomputer CCPU through communications.

Switches SW1 and SW2 are interlocked with a release button (not shown). When the release button is depressed to its first-stroke position, the switch SW1 is turned on, and when the release button is subsequently depressed to its second-stroke position, the switch SW2 is turned on. As will be described later, the camera microcomputer CCPU generates a start signal for a photometric operation, an autofocusing operation, and an image stabilizing operation in response to the ON operation of the switch SW1, and performs exposure control and the film winding operation in response to the ON operation of the switch SW2 as a trigger.

Note that the switch SW2 is connected to an "interrupt input terminal" of the camera microcomputer CCPU. Thus, even during execution of a program to be executed when the switch SW1 is turned on, the execution of the program is interrupted when the switch SW2 is turned on, and a predetermined interrupt program can be immediately started.

A motor MTR1 for feeding a film and a motor MTR2 for moving a mirror upward/downward and charging a shutter spring are respectively controlled by drivers MDR1 and MDR2 so as to be rotated in the normal/reverse direction.

Magnets MG1 and MG2 for starting traveling of front and rear curtains of a shutter are respectively energized by amplifying transistors TR1 and TR2, and a shutter STR is controlled by the camera microcomputer CCPU.

The arrangement of the lens LNS will be described below.

A lens microcomputer LCPU is a one-chip microcomputer having a ROM, a RAM, and an A/D conversion function like in the camera microcomputer CCPU. The lens microcomputer LCPU performs driving control of a focusing lens FLNS and a diaphragm according to a command supplied from the camera main body CMR through the signal line DCL. The lens microcomputer LCPU transmits various operation conditions (the driving amount of the focusing optical system, the step count of the diaphragm, and the like) of the lens, and parameters (full-open f-number, the focal length, a coefficient for a defocus amount with respect to an extending amount, and the like) to the camera main body through the signal line DLC.

A motor FMTR drives the focusing lens FLNS. The motor FMTR rotates a helicoid ring (not shown) through a gear train to move the lens FLNS forward/backward in the optical axis direction, thereby performing a focusing operation.

A driver FDR controls normal/reverse rotation, braking, and the like of the motor FMTR according to a signal from the lens microcomputer LCPU.

This embodiment exemplifies a front-element focusing type optical system. When a focusing command is supplied from the camera main body CMR, the motor FMTR is driven according to a driving amount and a driving direction supplied simultaneously with the focusing command so as to move the focusing lens FLNS in the optical axis direction, thereby performing the focusing operation. The moving amount of the focusing lens FLNS is monitored by counting pulse signals output from an encoder ENCF by an internal counter of the lens microcomputer LCPU, and upon completion of a predetermined movement, the motor FMTR is controlled.

For this reason, once the focusing command is supplied from the camera main body CMR, the camera microcomputer CCPU need not participate in the lens driving operation until the lens driving operation is completed. The content of the counter can be supplied to the camera main body CMR as needed.

An encoder ENCB detects the absolute position of the focusing lens FLNS, and an encoder ENCZ detects a zoom position. These encoders supply signals detected by a known method using, e.g., code patterns and detection brushes provided to the helicoid ring and a zoom ring to the lens microcomputer LCPU.

When a diaphragm control command is supplied from the camera main body CMR, a known stepping motor DMTR for driving the diaphragm is driven according to the step count of the diaphragm supplied simultaneously with the control command.

An image stabilization microcomputer ICPU controls an image stabilizing operation, and receives a signal DCL from the camera main body CMR to the lens LNS, and a signal DLC from the lens LNS to the camera main body CMR. The output signal from the microcomputer ICPU is input to the lens microcomputer LCPU. More specifically, a communication with the camera microcomputer CCPU is performed with only the lens microcomputer LCPU, and the image stabilization microcomputer ICPU monitors the communication therebetween. A communication from the image stabilization microcomputer ICPU to the camera microcomputer CCPU is performed through the lens microcomputer LCPU.

An angle deviation detector AD detects a vibration of the lens LNS. The detector AD employs, e.g., a sensor utilizing the inertia of a fluid in a cylindrical case in Japanese Patent Application No. 2-201183 proposed by the present applicant. An angle deviation output θ from the angle deviation detector is transmitted to the image stabilization microcomputer ICPU. The image stabilization microcomputer ICPU supplies control signals SAD1 and SAD2 for controlling response frequency characteristics of the angle deviation detector to the angle deviation detector.

As will be described later, an image stabilization control circuit ICNT has a filter, an amplifier, a switch, and the like, and controls the driving operation of an image stabilizing actuator IACT (to be described later). For this purpose, the control circuit ICNT has a signal input/output line for exchanging signals with a position detection sensor PSD and the image stabilization microcomputer ICPU.

A correction optical system ILNS serves as an optical axis decentering means, and is supported by a guide mechanism (to be described later) to be movable parallel to a plane perpendicular to the optical axis.

The image stabilizing actuator IACT is arranged in the support mechanism, and is constituted by a magnetic circuit comprising a permanent magnet, and a coil which is moved in the magnetic circuit. The actuator IACT deviates the correction optical system ILNS.

The position detection sensor PSD detects the position of the correction optical system ILNS. When light emitted from an infrared light-emitting diode IRED is incident on the light-receiving surface of the position detection sensor PSD through a slit SLT moved integrally with the correction optical system ILNS, the position detector sensor PSD generates a position signal of the incident light, i.e., a position signal (deviation $d_L$) of the correction optical system ILNS. The position signal ($d_L$) is input to the image stabilization microcomputer ICPU and the image stabilization control circuit ICNT.

A main switch SWIS for an image stabilizing system supplies a power supply voltage to the image stabilization microcomputer ICPU and its peripheral circuit when it is turned on, and the image stabilization control circuit ICNT starts its operation. When the switch SW1 of the camera main body CMR is turned on, the ON signal is supplied to the image stabilization microcomputer ICPU through the lens microcomputer LCPU, and a motor IMTR is driven to start the image stabilizing operation.

The angle deviation detector AD as a detection sensor will be described below with reference to FIGS. 3A and 3B.

The basic arrangement of the angle deviation detector AD is substantially the same as that proposed in Japanese Patent Application No. 2-201183. In the following description, a circuit obtained by slightly modifying and simplifying the control circuit will be described below.

The mechanical arrangement portion will be described below.

A liquid is filled in a cylindrical outer cylinder 21, and a float 22 made by a plastic magnet is supported in the liquid to be rotatable about a bearing 27. A light-emitting element 25 and a light-receiving element 26 for optically detecting the movement of the float 22 are arranged, as shown in FIG. 3A. Furthermore, a yoke 23 constitutes a closed magnetic circuit with the float 22. A coil 24 is arranged between the yoke 23 and the float 22.

The electrical arrangement portion will be described below.

A portion A surrounded by a dotted line is a position detection section for detecting the position of the float 22 with respect to the outer cylinder 21, and is a basic arrangement for detecting infrared light emitted from the light-emitting element 25 and reflected by the float 22 using the light-receiving element 26 for position detection. Photocurrents Ia and Ib generated by the light-receiving element 26 are divided according to the center-of-gravity position of the infrared light incident on the light-receiving element 26, and are differentially amplified by an operational amplifier 28, thereby outputting an angle deviation of the float 22, i.e., a vibration angle deviation (θ) of a lens barrel.

A portion B surrounded by a dotted line is a control section for varying parameters of the sensor. In FIG. 3A, two switches SWAD1 and SWAD2 are ON/OFF-controlled by the image stabilization microcomputer ICPU through control lines SAD1 and SAD2. When the line goes to high level, the corresponding switch is turned on (closed). When the switch is kept OFF (open), the angle deviation output θ is amplified by an operational amplifier 29 with an amplitude rate of "$R_3/R_0$". When the switch is turned on, a resistor $R_1$, or $R_2$ is connected in parallel with a resistor $R_0$, and as a result, the resistance is decreased, thus increasing the amplitude rate. For example, when "$R_0=R_1=R_3=2R_2$", the amplitude rate of the operational amplifier 29 is set, as shown in FIG. 3B.

A portion C surrounded by a dotted line is a driver section for driving the coil 24, and an operational amplifier 30 serves as a buffer. Therefore, a current according to the output voltage from the control section B flows through the coil 24. In other words, since the coil current proportional to the angle deviation (θ) of the float 22 flows, the float 22 receives a restoring force proportional to the angle deviation (θ), and this restoring force can be switched by the switches SWAD1 and SWAD2. As the restoring force is larger, the angle deviation output θ converges to "0" earlier. As sensor characteristics, strong high-pass characteristics can be obtained. That is, the following characteristics can be provided.

The vibration detection performance at a low frequency is lowered.

The angle deviation output θ which is saturated upon panning can escape from a saturation region earlier.

The rising time of the sensor when the power switch is turned on is shortened.

FIG. 1 illustrates an image stabilizing mechanism portion for only one axis. However, since a camera vibration occurs in two-dimensional directions, i.e., in the vertical and horizontal directions, a vibration in the two-axis directions must be detected for an actual lens, and the correction optical system ILNS must be operated two-dimensionally.

Figure 4:
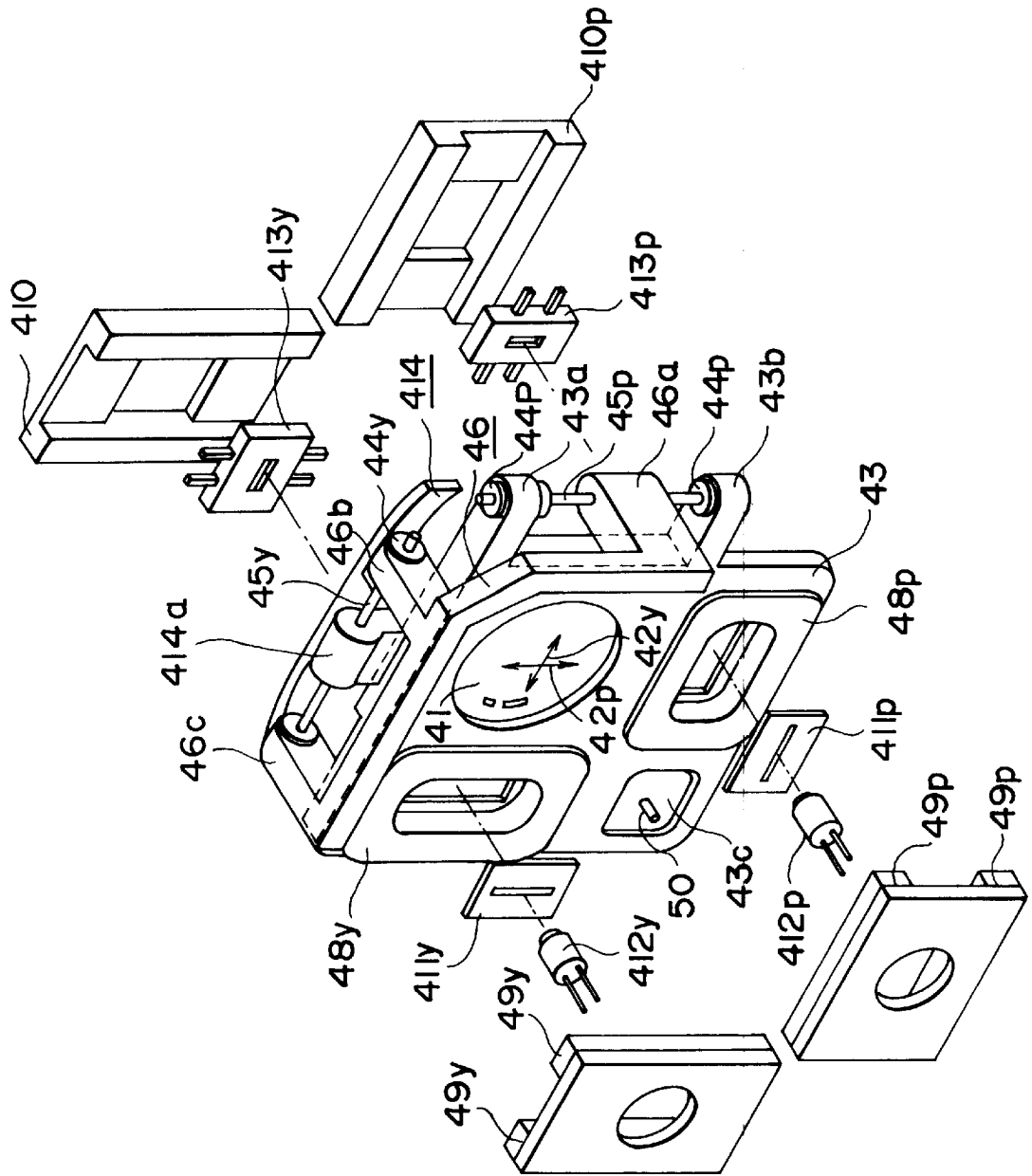
FIG. 4 is a perspective view showing a correction optical mechanism according to the first embodiment of the present invention.

FIG. 4 shows the details of a support mechanism portion of the correction optical system ILNS. This correction optical mechanism is a mechanism for suppressing an image blur on the focal plane by moving a correction lens 41 corresponding to the correction optical system ILNS in FIG. 1 in a plane perpendicular to the optical axis in a direction to stabilize the camera vibration.

The correction lens 41 is movable in two orthogonal directions (a pitch direction 42p and a yaw direction 42y) perpendicular to the optical axis. The arrangement of this mechanism will be described below.

In FIG. 4, a fixing frame 43 for holding the correction lens 41 is slidable along a pitch slide shaft 45p through sliding bearings 44p formed of, e.g., a polyacetal resin (to be referred to as POM hereinafter) fixed to arm-like projections 43a and 43b. The pitch slide shaft 45p is attached to a projection 46a of a holding frame 46. A pitch coil 48p is attached to the fixing frame 43. The pitch coil 48p is arranged in a magnetic circuit constituted by a pitch magnet 49p and a pitch yoke 410p, and when a current flows through this magnetic circuit, the fixing frame 43 is driven in the pitch direction 42p. The pitch coil 48p has a slit 411p, and the position of the fixing frame 43 in the pitch direction 42p is detected by a combination of a light-emitting element 412p (infrared light-emitting diode IRED) and a light-receiving element 413p (semiconductor position detection element PSD).

The driving mechanism in the pitch direction has been described.

The driving mechanism in the yaw direction (the direction of the arrow 42y) will be described below.

Sliding bearings 44y formed of, e.g., a POM are attached to projections 46b and 46c on the holding frame 46. A yaw slide shaft 45y is fixed to a projecting portion 414a on a housing 414 attached to a lens barrel (not shown). Since the bearings 44y are slidable along the shaft 45y, the holding frame 46 and the fixing frame 43 are also movable in the yaw direction (the direction of the arrow 42y). A yaw coil 48y is attached to the fixing frame 43. The fixing frame 43 is also driven in the yaw direction 42y by an interaction with a magnetic field formed by a yaw magnet 49y and a yaw yoke 410y sandwiching the yaw coil therebetween. The yaw coil 48y has a slit 411y, and the position of the fixing frame 43 in the yaw direction 42y is detected like in the pitch direction. The correction lens 41 is driven in the pitch direction 42p and the yaw direction 42y by the arrangement shown in FIG. 1.

The position, in the optical axis direction, of a flat portion 43c formed on the lower left portion of the fixing frame 43 is restricted by projections 50, provided to the housing 414, for preventing a vibration. The fixing frame 43 has the two position regulating portions 43a and 43b in the pitch direction, and the two position regulating portions 46b and 46c in the yaw direction. For this reason, in order to regulate the movement of the fixing frame 43 only in a shift direction, at least three position regulating portions (holding portions) are necessary. Therefore, the two projections 50 (one on the rear surface side is not shown) regulate the positions of the flat portion 43c from the front and rear surfaces, thereby preventing the fixing frame 43 from being moved (deviating) in the optical axis direction.

In the above arrangement, the correction lens 41 can be driven independently in the pitch and yaw directions.

Additionally, this correction optical system is movably mounted along an optical axis in a lens barrel upon zooming operation.

A driving circuit for the above-mentioned correction optical system supporting mechanism will be described below.

Figure 5:
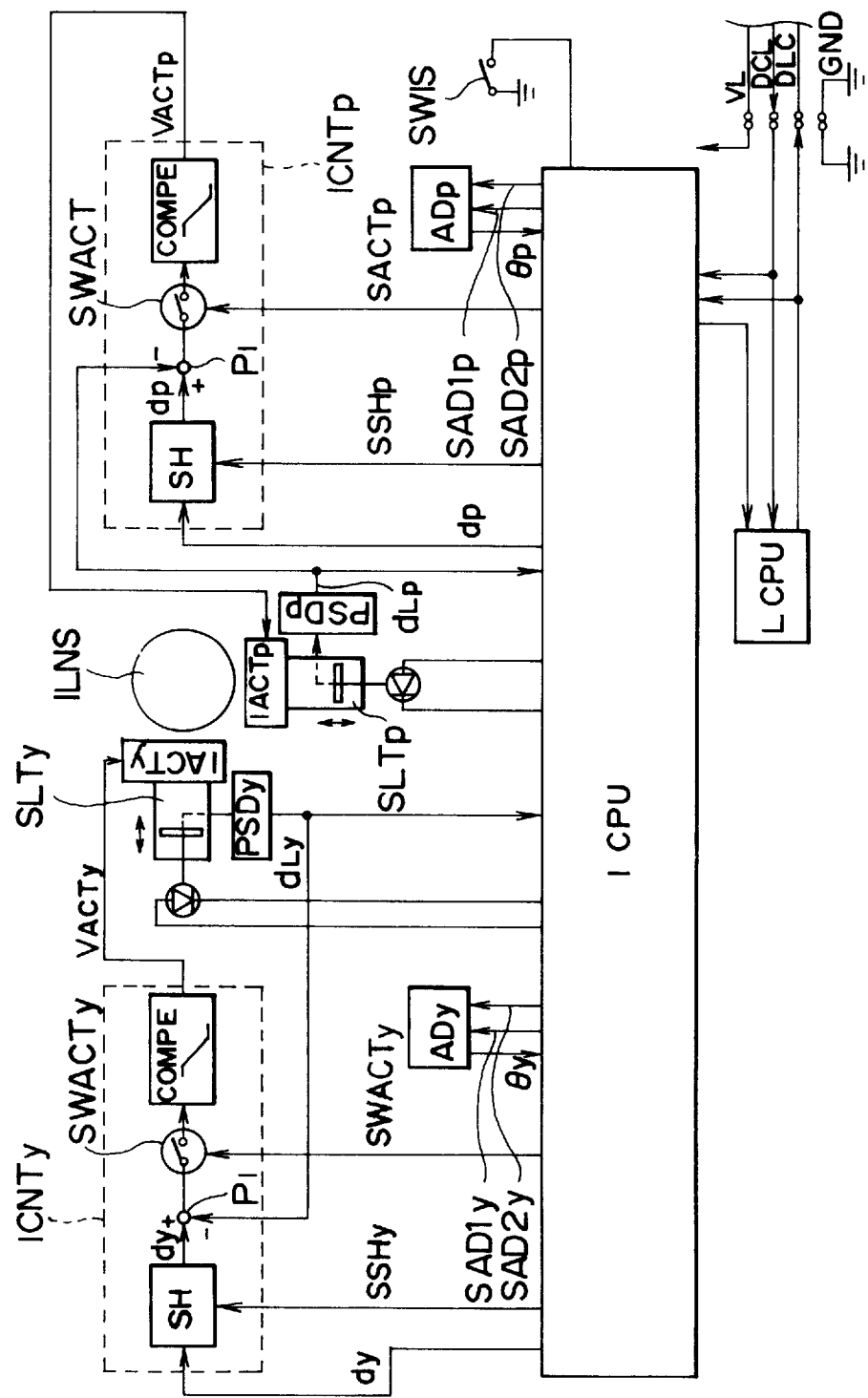
FIG. 5 is a block diagram showing an image stabilizing control circuit according to the first embodiment of the present invention.

FIG. 5 shows the details of the image stabilization control section. Portions surrounded by dotted lines correspond to the image stabilization control circuit ICNT shown in FIG. 1. Two sets of the circuits ICNT, the angle deviation detectors AD, and the like are arranged in correspondence with the driving circuits in the pitch and yaw directions. In FIG. 5, reference symbols of components and signal lines for the pitch direction are added with a suffix "p", and those for the yaw direction are added with a suffix "y". The following description will be made commonly to the pitch and yaw directions, and the suffices p and y will be omitted.

The angle deviation detector AD outputs the vibration angle deviation (θ) of the lens barrel. The control lines SAD1 and SAD2 are used for changing the vibration detection characteristics of the angle deviation detector AD. When the lines SAD1 and SAD2 go to high level, the high-pass characteristics of the angle deviation detector AD are strengthened to lower detection performance with respect to a vibration at a low frequency. More specifically, when the angle deviation output θ is saturated by, e.g., a panning operation, the lines SAD1 and SAD2 are set at high level, thus quickening return of the angle deviation output θ to "0".

The angle deviation output θ is coefficient-converted in the image stabilization microcomputer ICPU into a control signal d, and the control signal d is input to a sample-hold circuit SH in the image stabilization control circuit ICNT. The sample-hold circuit SH is controlled by a control line SSH from the image stabilization control circuit ICNT. When the line SSH is at low level, the control signal d passes through the circuit SH. When the line SSH goes to high level, the circuit SH holds the control signal d at that time, and keeps outputting the held control signal.

A switch SWACT ON/OFF-controls a control signal input to the actuator IACT, and is controlled by the image stabilization microcomputer ICPU. When the switch SWACT is turned on, the driving operation of the actuator IACT is started, and the image stabilizing operation is started.

A phase compensation circuit COMPE is used for improving stability of a feedback loop system, and its output signal $V_{ACT}$ serves as an application voltage to the actuator IACT.

When the actuator IACT operates, the correction optical system ILNS is driven, and the deviation signal $d_L$ of the correction optical system ILNS is output from the PSD upon operation of the slit SLT moved integrally with the optical system ILNS and the IRED and PSD fixed to the housing. When the signal $d_L$ is inverted, and is input to an addition point P1, a feedback loop having d as a control amount is formed, and the driving operation of the correction optical system ILNS is controlled by a deviation corresponding to the control signal d.

The operations in the camera main body CMR and the lens LNS in the above arrangement will be described below with reference to FIGS. 6 and 7.

The operation at the side of the camera main body CMR will be described below with reference to the flow chart shown in FIG. 6.

When a power switch (not shown) of the camera main body CMR is turned on, power supply to the camera microcomputer CCPU is started, and an operation from step (002) is started via step (001).

In step (002), the state of the switch SW1, which is turned on when the release button is depressed to its first-stroke position, is detected. If the switch SW1 is OFF, the flow advances to step (003) to clear and initialize all the control flags and variables set in the RAM in the camera microcomputer CCPU. The flow then advances to step (004).

In step (004), a command for stopping the image stabilizing operation (IS) is transmitted to the lens LNS side.

Steps (002) to (004) described above are repetitively executed until the switch SW1 is turned on or the power switch is turned off.

When the switch SW1 is turned on, the flow advances from step (002) to step (011).

In step (011), a lens communication is performed. This communication is one for obtaining information necessary for exposure control (AE) and focusing control (AF). When the camera microcomputer CCPU transmits a communication command to the lens microcomputer LCPU through the signal line DCL, the lens microcomputer LCPU transmits information such as a focal length, an AF sensitivity, a full-open f-number, and the like, which are stored in the ROM, through the signal line DLC.

In step (012), a command for starting the image stabilizing operation is transmitted to the lens LNS side.

In step (013), a "photometry" subroutine for exposure control is executed. More specifically, the camera microcomputer CCPU receives the output from the photometry sensor SPC at its analog input terminal, and A/D-converts the input data to obtain a digital photometric value Bv.

In step (014), an "exposure calculation" subroutine for obtaining an exposure control value is executed. In this subroutine, a shutter value Tv and an aperture value Av are determined according to an apex formula "Av+Tv=Bv+Sv" and a predetermined program chart, and are stored at a predetermined address in the RAM.

In step (015), an "image signal input" subroutine is executed. In this subroutine, the camera microcomputer CCPU receives an image signal from the focus detection sensor SNS.

In step (016), the defocus amount of a photographing lens is calculated on the basis of the input image signal.

Since the subroutine flows in steps (015) and (016) are disclosed in, e.g., Japanese Patent Application No. 61-160824 by the present applicant, a detailed description thereof will be omitted herein.

In step (017), a "lens driving" subroutine is executed. In this subroutine, only the number of driving pulses of the focusing lens FLNS calculated in step (016) at the camera main body CMR side is transmitted to the lens microcomputer LCPU, and thereafter, the lens microcomputer LCPU controls the driving operation of the motor FMTR according to a predetermined acceleration/deceleration curve. After the driving operation is completed, an end signal is transmitted to the camera microcomputer CCPU, and this subroutine is ended. Thereafter, the flow returns to step (002).

A case will be described below wherein a release interrupt occurs upon an ON operation of the switch SW2 during execution of the operations in a focusing cycle in steps (015) to (017) surrounded by a broken line.

As described above, the switch SW2 is connected to the interrupt input terminal of the camera microcomputer CCPU. When the switch SW2 is turned on, the flow immediately jumps to step (021) by an interrupt function irrespective of the currently executed step.

When an interrupt by the switch SW2 occurs during execution of one of the steps surrounded by the broken line, the flow advances to step (022) via step (021).

In step (022), a release operation is performed.

In step (023), a film winding operation is performed to complete a photographing operation for one frame, and the flow returns to step (002).

Note that the subroutines in steps (013) to (017), and steps (022) and (023) are known, and a detailed description thereof will be omitted.

The image stabilizing operation performed at the lens LNS side will be described below with reference to the flow chart shown in FIG. 7. In each step, a reference symbol added with a suffix py indicates that operations in the pitch and yaw directions are sequentially performed in the step.

In step (101), the image stabilization main switch SWIS is turned on, and the image stabilization microcomputer ICPU and its peripheral circuit, the angle deviation detector AD, and the like are powered. Thus, the image stabilization microcomputer ICPU starts execution of a program in step (102) and subsequent steps shown in FIG. 7.

In step (102), all the flags and variables in the image stabilization microcomputer ICPU are cleared to "0". In step (103), the control lines SAD1$_{py}$ and SAD2$_{py}$ are set at high level to give strong high-pass characteristics to the angle deviation outputs $\theta_{py}$ from the angle deviation detectors AD$_{py}$, so that the deviation of the correction optical system ILNS is started from a state near the origin at the beginning of the image stabilizing operation. In step (104), the control lines SSH$_{py}$ are set at low level to allow passage of the control deviations d$_{py}$.

In step (105), it is checked if an image stabilization (IS) start command is input. If no IS start command is input from the camera main body CMR, the flow advances to step (106). In step (106), the switches SWACT$_{py}$ are turned off (opened) to inhibit the control signals from being input to the actuators IACT$_{py}$, i.e., to inhibit the image stabilizing operation. The flow returns to step (103), and steps (103) to (106) are repetitively executed. In this state, the image stabilizing operation is not performed.

When the IS start command is received from the camera main body CMR during execution of steps (103) to (106), the flow advances from step (105) to step (111).

In step (111), the control lines SAD1$_{py}$ and SAD2$_{py}$ are set at low level to set the vibration detection characteristics of the angle deviation detectors AD$_{py}$ in a camera vibration stabilizing enable state. In step (112), the switches SWACT$_{py}$ are turned on to start the image stabilizing operation.

In step (113), the states of the encoders ENCZ and ENCB for respectively detecting the zoom ring position and the focusing lens position are detected, and a focal length f, a photographing magnification β, and a decentering sensitivity S$_d$(f, β) at that time are read out from data stored in the ROM on the basis of the output information of the encoders. Note that S$_d$(f, β) is matrix data stored in the ROM, and data corresponding to the values f and β is read out.

In step (114), an image stabilization angle upper limit value $\theta_f$ at the focal length f in the photographing operation is calculated according to the following equation:

$$\theta_f = \theta_{Tele}\{1-\beta+\beta(f_{Tele}/f)\}$$

where $\theta_{Tele}$ is the maximum image stabilization angle at the telephoto-end, $f_{Tele}$ is the focal length at the telephoto-end, and β is a constant for determining a change rate of the image stabilization angle upper limit value $\theta_f$. When the image stabilization angle upper limit value $\theta_f$ at "f=100, 170, and 300 mm" are calculated for β="0.2", "$\theta_{Tele}$"="0.023 rad", and "$f_{Tele}$"="300 mm" according to FIG. 27, the results shown in FIG. 8 can be obtained.

FIG. 8 also shows an image stabilization amount upper limit value d$_{IMf}$ on the image plane and a deviation upper limit value d$_f$ of the correction optical system ILNS calculated using equations ① and ② described above.

In step (115), a coefficient k for converting the vibration angle deviation θ into the control deviation d of the correction optical system ILNS in equation ④ described above is calculated.

In steps (116) to (121), deviation control in the pitch direction of the correction optical system ILNS is performed.

In step (116), the image stabilization angle upper limit value $\theta_f$ calculated in step (114) and the current vibration angle deviation $\theta_p$ are compared with each other. If the absolute value of the vibration angle deviation $\theta_p$ is smaller than the image stabilization angle upper limit value $\theta_f$, the flow advances to step (117) to perform the image stabilizing operation; otherwise, the flow advances to step (120) to interrupt the image stabilizing operation.

In step (117), the vibration angle deviation $\theta_p$ is converted into the deviation control value $d_p$ of the correction optical system ILNS, and the control value is output to the sample-hold circuit $SH_p$. In step (118), the control line $SSH_p$ is set at low level to disable the sample-hold circuit $SH_p$ so as to allow the signal $d_p$ to pass through the sample-hold circuit $SH_p$. In step (119), the control line $SAD1_p$ is set at low level to set the vibration detection characteristics of the angle deviation detector $AD_p$ in a camera vibration stabilizing enable state. More specifically, in steps (117), (118), and (119), a normal image stabilizing operation is performed.

If it is determined in step (116) that the absolute value of the vibration angle deviation $\theta_p$ is equal to or larger than the image stabilization angle upper limit value $\theta_f$, the flow advances to step (120), and the control line $SSH_p$ is set at high level in step (120). Thus, the output from the sample-hold circuit $SH_p$ is fixed to an input value at that time. Therefore, the deviation of the correction optical system ILNS is kept fixed near $d_f$ in FIG. 8, thus interrupting the image stabilizing operation. In step (121), the control line $SAD1_p$ is set at high level, and high-pass characteristics are given to the angle deviation detector $AD_p$, so that its output signal $d_p$ quickly returns to zero and image stabilization is restarted.

In steps (116) to (121) described above, control in the pitch direction is performed. In step (122), the same control as described above is performed in the yaw direction. In FIG. 7, a detailed description of this control is omitted, and is simply illustrated as step (122).

In step (123), it is checked if the IS stop command is received from the camera main body CMR. If NO in step (123), the flow returns to step (113) to continue the image stabilizing operation in the pitch and yaw directions; otherwise, the flow returns to step (103), and the image stabilizing operation is stopped in step (106). Since the flow in steps (113) to (123) is repetitively executed at a cycle as short as several msec, a camera vibration having a frequency band of about 1 to 10 Hz can be sufficiently stabilized.

Figure 9:
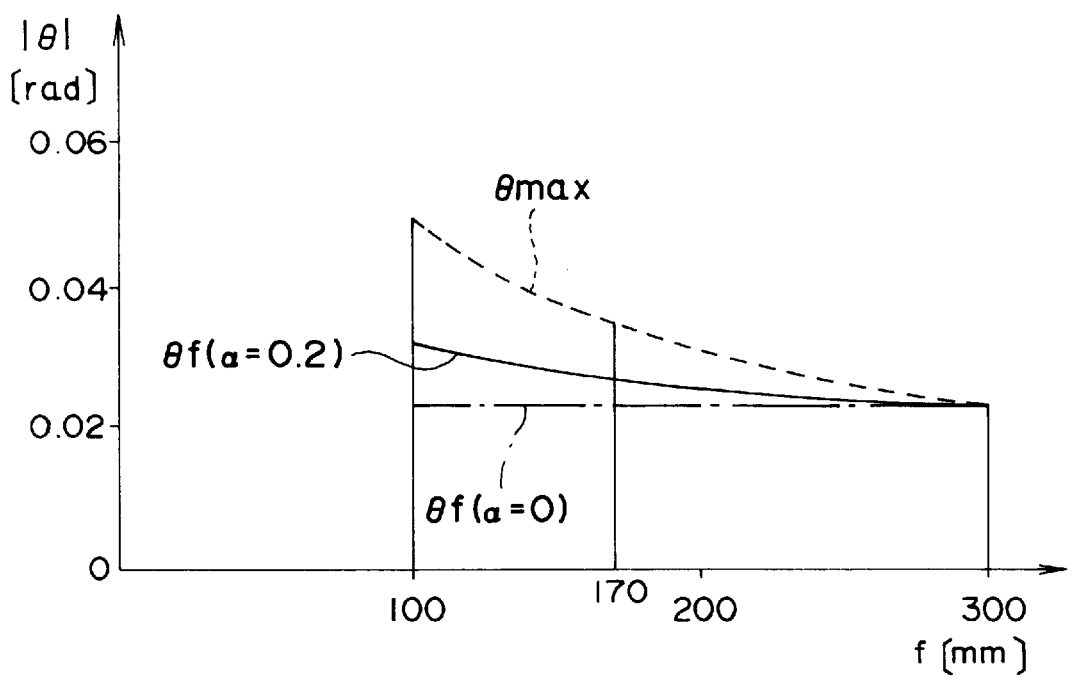
FIG. 9 is a graph for explaining the effect according to the first embodiment of the present invention.
Figure 10:
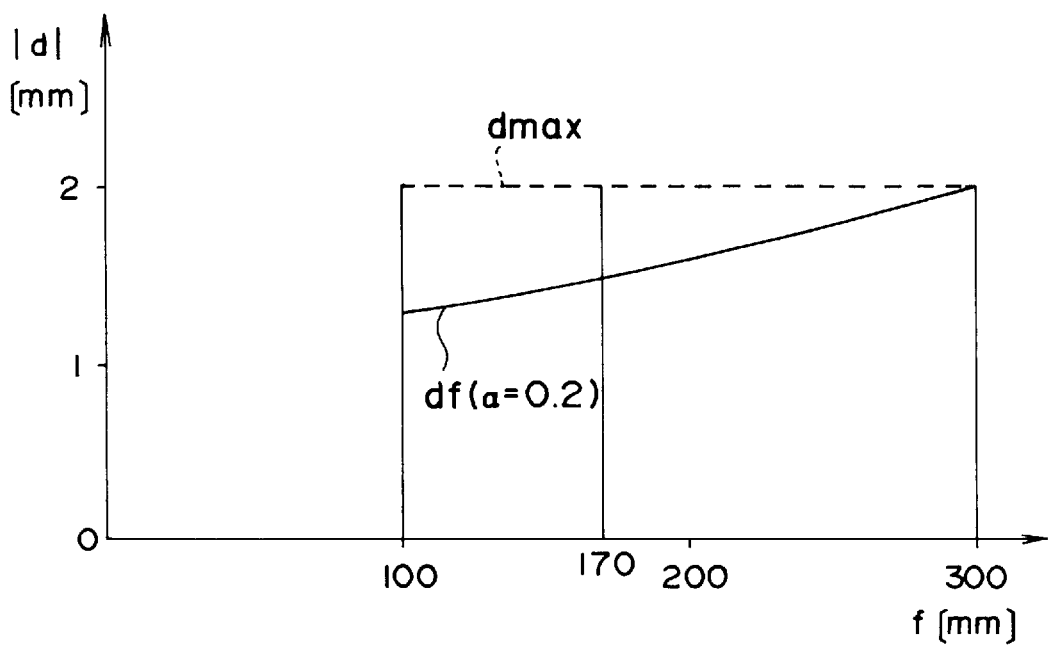
FIG. 10 is a graph for explaining the effect according to the first embodiment of the present invention.

FIGS. 9 and 10 show the effects of the above-mentioned flow.

FIG. 9 shows a change in possible image stabilization angle with respect to the focal length f. The angle θmax indicated by a broken curve corresponds to the prior art, and the angle $\theta_f$ indicated by a solid curve corresponds to this embodiment. As can be seen from FIG. 9, in the prior art, a change in possible image stabilization angle with respect to the focal length f is large, while in this embodiment, the inclination of this change is decreased.

In this embodiment, the possible image stabilization angle at the wide-side is set to be slightly larger than that at the telephoto-side in consideration of a case that a photographer holds a camera paying relatively little attention to prevention of camera vibration, and the vibration is increased more or less. In this case, if the constant α in step (114) in FIG. 7 is set to be zero, the possible image stabilization angle can be kept to be completely constant, as indicated by an alternate long and short dashed line in FIG. 9.

FIG. 10 shows a possible deviation amount of the correction optical system ILNS with respect to the focal length f. In the prior art indicated by a broken line, the deviation amount is constant regardless of the focal length f. However, in this embodiment indicated by a solid curve, the movable range of the optical system ILNS is regulated at the wide-side.

In the first embodiment, the possible image stabilization angle is set to be substantially constant regardless of the focal length, thereby improving operability. In the second embodiment of the present invention to be described below, the possible image stabilization range is regulated according to an aberration generation condition upon zooming, so that a photograph free from an aberration can always be obtained.

When a zoom optical system having an image stabilizing function is designed, it is ideal that an aberration is corrected over the entire zoom region even when the correction optical system ILNS is driven to its possible deviation maximum value. However, the aberration cannot always be completely corrected due to various limitations. On the other hand, since the necessity of camera vibration stabilization is important on the telephoto-side, the design of the optical system normally places an importance on aberration correction at the telephoto-side. Consequently, an aberration upon image stabilization at the wide-side is increased.

Figure 11:
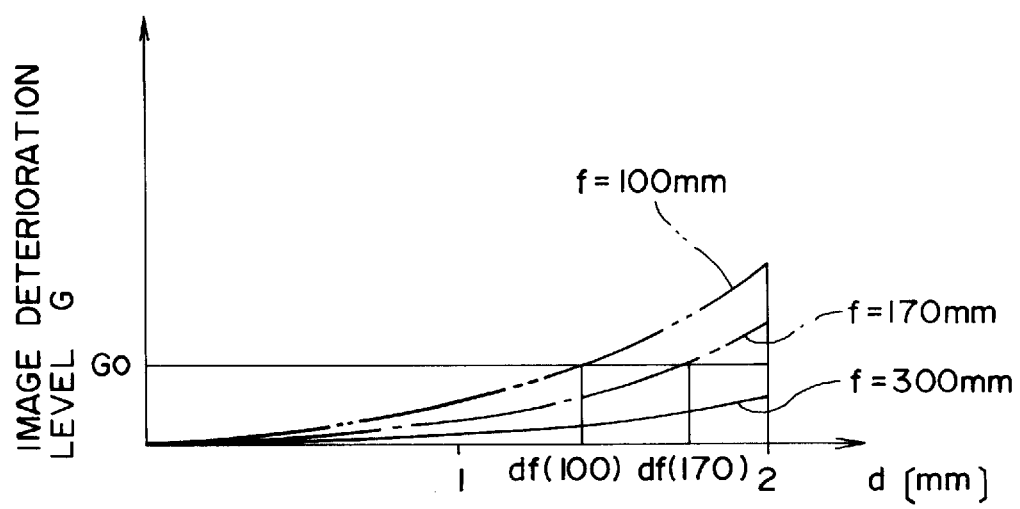
FIG. 11 is a graph for explaining the effect according to the second embodiment of the present invention.

FIG. 11 illustrates an aberration generation condition with respect to the deviation d of the correction optical system ILNS. The deviation d is plotted along the abscissa, and an image deterioration level G corresponding to an aberration amount is plotted along the ordinate. In FIG. 11, $G_0$ is the allowable deterioration level. At the telephoto-end (f = 300 mm), an aberration falls within an allowable range over the entire movable region of the correction optical system ILNS. However, at f=170 mm and 100 mm, as shown in FIG. 11, an aberration exceeds the allowable level before the maximum deviation (±2 mm) is reached.

In the second embodiment, the maximum deviation allowable amount of the correction optical system ILNS at each focal length f is stored in the image stabilization microcomputer ICPU, and the deviation of the optical system upon image stabilization is limited according to the stored value.

Figure 12:
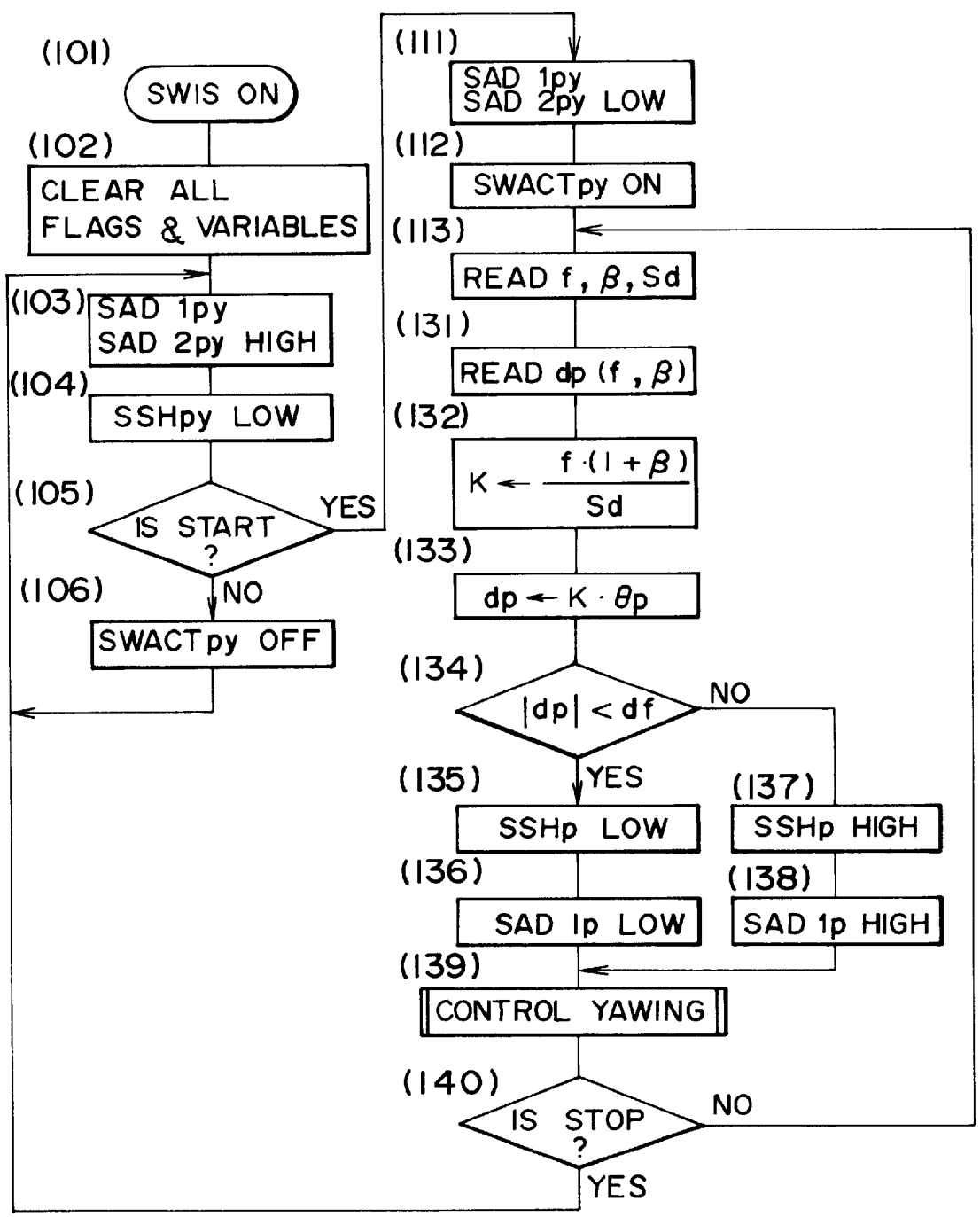
FIG. 12 is a flowchart showing an image stabilizing operation at the lens side of a camera comprising an apparatus according to the second embodiment of the present invention.

FIG. 12 is a flowchart showing the image stabilizing operation of the second embodiment.

In FIG. 12, since steps (101) to (113) are the same as those in the first embodiment, step (131) and subsequent steps will be described below.

In steps (111) and (112), the image stabilizing operation is started, and in step (113), a focal length, a photographing magnification β, and a decentering sensitivity $S_d$ are read out from the internal ROM of the image stabilization microcomputer ICPU. Thereafter, in step (131), allowable deviation data $d_f$ of the correction optical system ILNS is read out from the ROM. The data $d_f$ is a function of the focal length f and the photographing magnification β like in the decentering sensitivity $S_d$, and is stored in the ROM as a matrix $d_f(f, \beta)$ according to the values of the respective variables. In step (132), a conversion coefficient k is calculated like in step (115) of the first embodiment.

In steps (133) to (138), deviation control in the pitch direction of the correction optical system ILNS is performed.

In step (133), a vibration angle deviation $\theta_p$ is converted into a deviation control value $d_p$ of the correction optical system ILNS like in step (117), and the control value is output to the sample-hold circuit $SH_p$. In step (134), the allowable deviation data $d_f$ of the correction optical system ILNS read out in step (131) is compared with the current deviation control amount $d_p$. If "$|d_p|<d_f$", the flow advances to steps (135) and (136), and the same operation as in steps (120) and (121) is performed to continue image stabilization. However, if "$|d_p|\geq d_f$", the flow advances to steps (137) and (138), and the deviation of the correction optical system ILNS is fixed like in steps (120) and (121).

In step (139), the same control as in steps (133) to (138) is performed in the yaw direction. In step (140), it is checked if the IS stop command is received from the camera main body CMR. If NO in step (140), the flow returns to step (113) to continue image stabilization in the pitch and yaw directions; otherwise, the flow returns to step (103), and the image stabilizing operation is stopped in step (106).

According to the first and second embodiments, since the possible driving range of the correction optical system ILNS is limited according to the zooming operation of the photographing optical system or the position of the focusing lens, an image stabilizing apparatus with good operability can be provided, and a photograph free from image deterioration can be provided.

More specifically, in the first embodiment, the deviation restriction means for the correction optical system ILNS is arranged, so that the possible image stabilization angle is kept substantially constant even when the focal length is changed. For this reason, panning operability can be prevented from being impaired even when the focal length is changed, and an image stabilizing apparatus with good operability can be provided.

In the second embodiment, the deviation maximum value of the correction optical system ILNS at each focal length is stored in the internal ROM of the image stabilization microcomputer ICPU, and the deviation of the correction optical system ILNS is restricted on the basis of the stored value. For this reason, image deterioration caused by an aberration can be prevented without impairing camera vibration stabilization performance, and a high-quality image can always be obtained.

In this embodiment, some lens groups of the photographing optical system are shifted in a direction perpendicular to the optical axis to perform image stabilization. When this operation is embodied using a variable vertical angle prism, the same effect as described above can be obtained. The variable vertical angle prism is proposed in Japanese Laid-Open Patent Application No. 2-59718, and the like by the present applicant, and performs image stabilization by inclining the optical axis in such a manner that a liquid is sealed between two plane-parallel glass plates, and the relative angle between the two glass plates is changed to provide a variable vertical angle prism effect. When the variable vertical angle prism is arranged in the photographing optical system, a constant of proportion between the deviation angle of the variable vertical angle prism and the image stabilization angle changes upon zooming, and an aberration generation condition also changes. Therefore, when the flows of the first and second embodiments of the present invention are applied to driving control of the variable vertical angle prism, the same effect as described above can be obtained.

The first and second embodiments may be easily combined, so that when the deviation of the correction optical system ILNS reaches a smaller limit value of two different deviation limitation devices, the driving operation may be restricted.

As described above, according to the first and second embodiments of the present invention, a limitation means for determining an upper limit value of a driving deviation of a correction optical mechanism according to the position of a zooming optical group or a focusing group, and limiting the deviation of the correction optical mechanism on the basis of the upper limit value is arranged in an image stabilizing means. When an image stabilization range changes upon, e.g., zooming, the deviation of the correction optical mechanism, i.e., the image stabilization range is limited according to the change in image stabilization range, so as to prevent the image stabilization range at the wide-side from becoming too wide, and to prevent the image stabilization range from including a region with a large aberration. Therefore, operability can be improved without impairing panning operability, and a photograph free from image deterioration can be provided.

Figure 26:
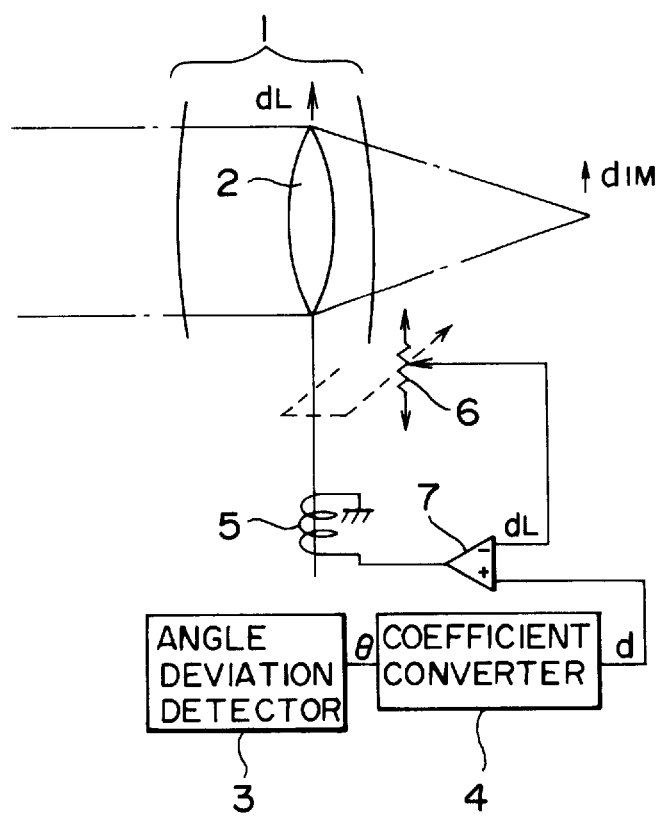
FIG. 26 is a diagram for explaining an image stabilizing control system of a conventional apparatus.

In the description of the conventional image stabilizing apparatus, the image stabilization principle, i.e., the relationship among a vibration angle deviation ($\theta$), a lens driving amount ($d_L$), and an image moving amount (deviation) $d_{IM}$ has already been described. As described above, in the image stabilizing correction optical system shown in FIG. 26 or 2, a decentering sensitivity $S_d$ with respect to a focal length f is as shown in FIG. 27.

On the other hand, a maximum deviation $d_L$max of the correction optical system ILNS is a value determined by the structure of the correction optical mechanism, and is left unchanged, i.e., constant regardless of the focal length f. Thus, a maximum image deviation $d_{IM}$MAX and a possible image stabilization angle $\theta$max have values shown in FIG. 27 according to equations ② and ①. More specifically, as can be understood from the above description, when the maximum deviation $d_L$max is constant, the possible image stabilization angle $\theta$max considerably changes upon zooming.

Note that the decentering sensitivity $S_d$ changes more or less according to a change in photographing magnification $\beta$. For this reason, a difference between the maximum and minimum possible image stabilization angles $\theta$max is still larger than the value shown in FIG. 27.

The effect of the third embodiment of the present invention will be described below with reference to FIGS. 13A and 13B.

Figure 13A:
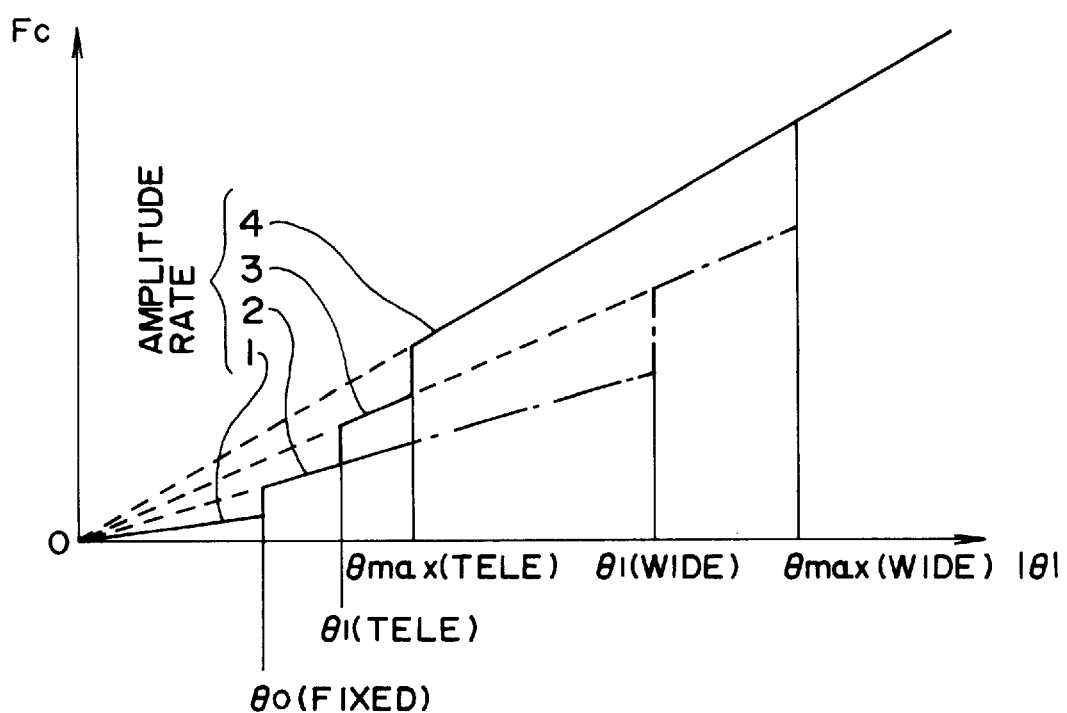
FIG. 13A is a graph for explaining the effect according to the third embodiment of the present invention.

In FIG. 13A, an image stabilization angle $\theta$, i.e., the absolute value of the deviation of the float 22 of the angle deviation detector AD shown in FIG. 3A is plotted along the abscissa, and a restoring force Fc acting on the float 22 is plotted along the ordinate. The restoring force is proportional to the deviation $\theta$, and the coefficient of proportion of the restoring force is determined by the ON/OFF states of the switches SWAD1 and SWAD2. Thus, four oblique lines passing the origin of FIG. 13A represent four different restoring forces according to the switching states of the switches SWAD1 and SWAD2. The amplitude rates shown in FIG. 13A correspond to those shown in FIG. 3B. FIG. 13B is a graph showing the vibration detection characteristics of the angle deviation detector upon selection of the four different amplitude rates shown in FIG. 13A. In FIG. 13B, the vibration frequency is plotted along the abscissa, and the output value from the angle deviation detector per unit deviation of vibration angle is plotted along the ordinate. In FIG. 13B, the vibration detection characteristics upon selection of the four different amplitude rates 1, 2, 3, and 4 shown in FIG. 13A are represented by characteristic curves $W_1$, $W_2$, $W_3$, and $W_4$ having cutoff frequencies $C_1$, $C_2$, $C_3$, and $C_4$. More specifically, as the amplitude rate becomes larger, the cutoff frequency of the vibration detection characteristics is increased so as not to respond to a low-frequency vibration. When a line with a large amplitude rate is selected, the restoring force of the float 22 is increased, and strong high-pass characteristics can be obtained. For this reason, when it is assumed that a panning operation is being performed, the restoring force is selected in the following manner.

Along the abscissa $|\theta|$ of FIG. 13A, $\theta_0$ is the vibration angle corresponding to a camera vibration. This value is determined with reference to the magnitude of a camera vibration occurring when an average photographer normally holds a camera. When the vibration angle is equal to or smaller than $\pm\theta_0$ [rad], it is assumed that a camera vibration occurs; when the vibration angle is larger than $\pm\theta_0$ [rad], it is assumed that a panning or framing change operation is performed.

The vibration angle $\theta_0$ is set to be, e.g., about 0.012 [rad] ($\approx 0.7°$). In a region where $|\theta|<\theta_0$, it is determined that only a camera vibration occurs, and the weakest restoring force is applied to the float 22. As a result, the vibration detection characteristics of the angle deviation detector AD are expanded to a low-frequency region, and accurate camera vibration detection, i.e., image stabilization can be performed.

When $|\theta|>\theta_0$, it is assumed that the panning operation is performed, and the second restoring force is selected. Thus, the high-pass characteristics of the angle deviation detector AD are rather strengthened, i.e., are switched to characteristics for detecting only a camera vibration without detecting the panning operation as a low-frequency vibration. More specifically, although camera vibration stabilization at a very low frequency is disabled, camera vibrations at middle and high frequencies during the panning operation can be stabilized.

$\theta$max is the possible image stabilization angle at the object field side. As shown in FIG. 27, the angle $\theta$max changes according to the focal length f. When the focal length f is large, the possible image stabilization angle $\theta$max is small; when the focal length f is small, the possible image stabilization angle $\theta$max is large. In either case, when the vibration angle exceeds the possible image stabilization angle $\theta$max, image stabilization is disabled. Therefore, at this time, the maximum restoring force is selected to quicken return of a vibration signal to the origin. Note that $\theta$max has a value 0.023 [rad] at the telephoto-end, and a value 0.050 [rad] at the wide-end, as shown in FIG. 27, and these values are represented by $\theta$max (Tele) and $\theta$max (Wide) in FIG. 13A. As a matter of course, the limit value of the possible vibration detection range of the angle deviation detector AD is larger than $\theta$max (Wide).

$\theta_1$ is the characteristic switching point plotted inside the possible image stabilization angle $\theta$max, i.e., inside the maximum deviation $d_L$max of the correction optical system ILNS, and is given by, for example:

$$\theta_1 = 0.8 \cdot \theta\text{max}$$

This switching point is used for considerably strengthening the restoring force to the origin before the correction optical system ILNS exceeds its possible driving range, and is helpful to reduce the possibility of deviation saturation upon an abrupt panning operation.

To summarize the above description, $\theta_0$ as the first characteristic switching point is left unchanged even when the focal length of the photographing optical system changes, and $\theta$max and $\theta_1$ as the second and third switching points change, as shown in FIG. 13A, according to a variation in possible image stabilization angle upon a change in focal length f. When the zoom position is at the telephoto-end, the vibration signal restoring characteristics of the angle deviation detector AD are defined as indicated by a solid polygonal line; when it is at the wide-end, the characteristics are defined as indicated by an alternate long and short dashed polygonal line.

Figure 6:
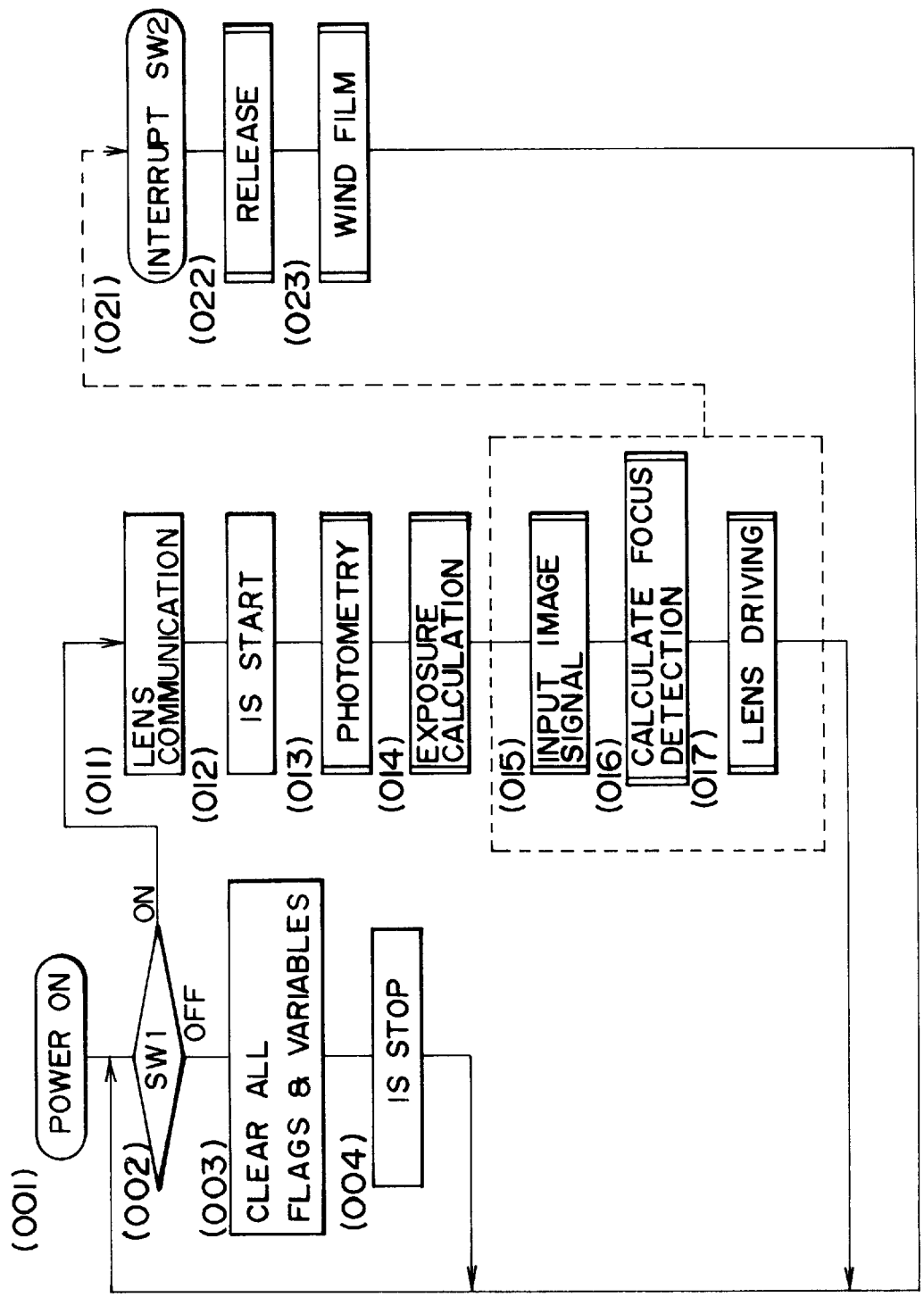
FIG. 6 is a flow chart showing an operation at the main body side of the camera comprising the apparatus according to the first embodiment of the present invention.
Figure 7:
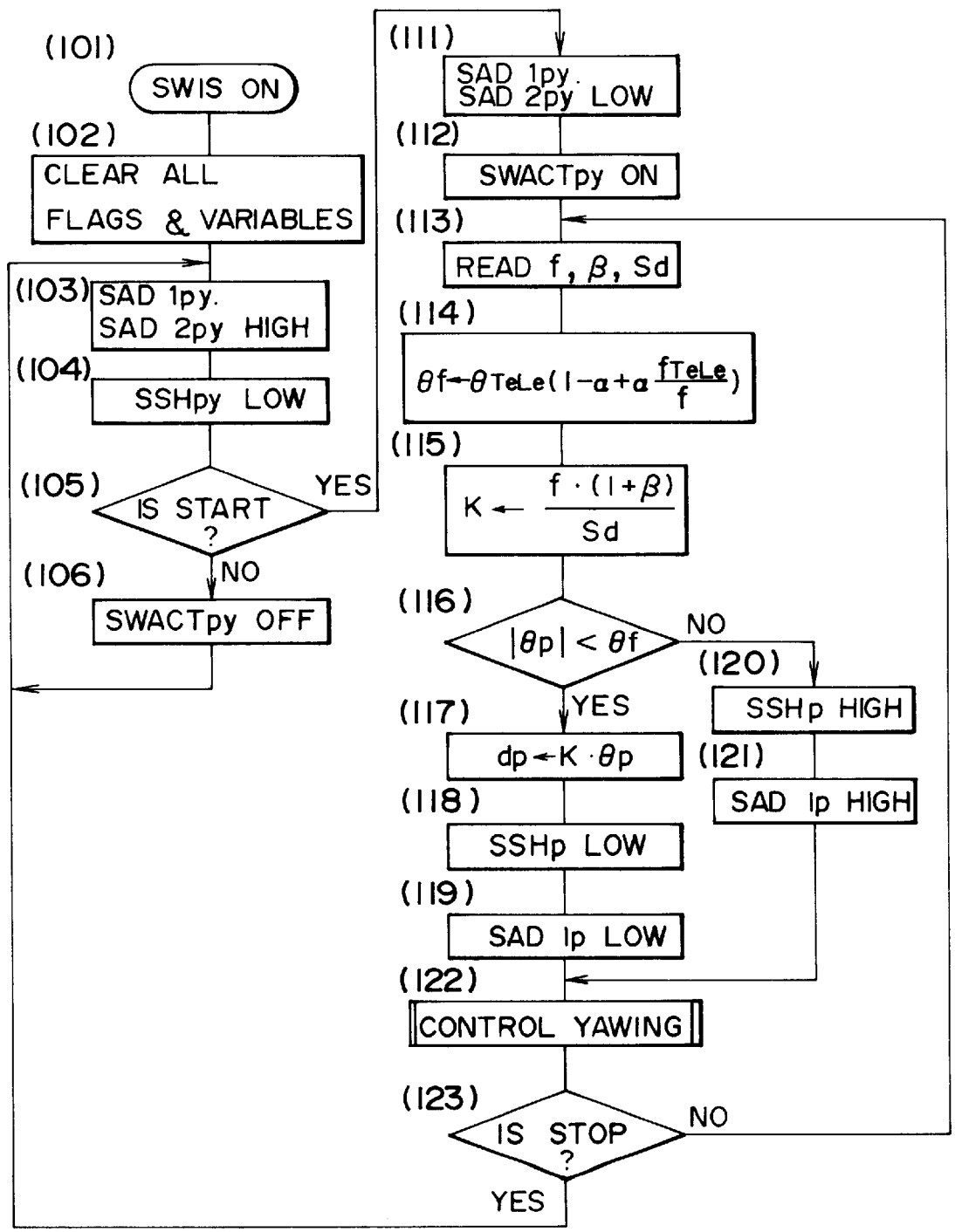
FIG. 7 is a flowchart showing an image stabilizing operation at the lens side of the camera comprising the apparatus according to the first embodiment of the present invention.

The operation of the camera main body CMR of this embodiment is the same as that of the first embodiment, and the camera main body CMR operates according to the flow shown in FIG. 6.

The image stabilizing operation performed at the lens LNS side will be described below with reference to the flow chart shown in FIG. 14. In each step, a reference symbol added with a suffix py indicates that operations in the pitch and yaw directions are sequentially performed in the step.

Figure 14:
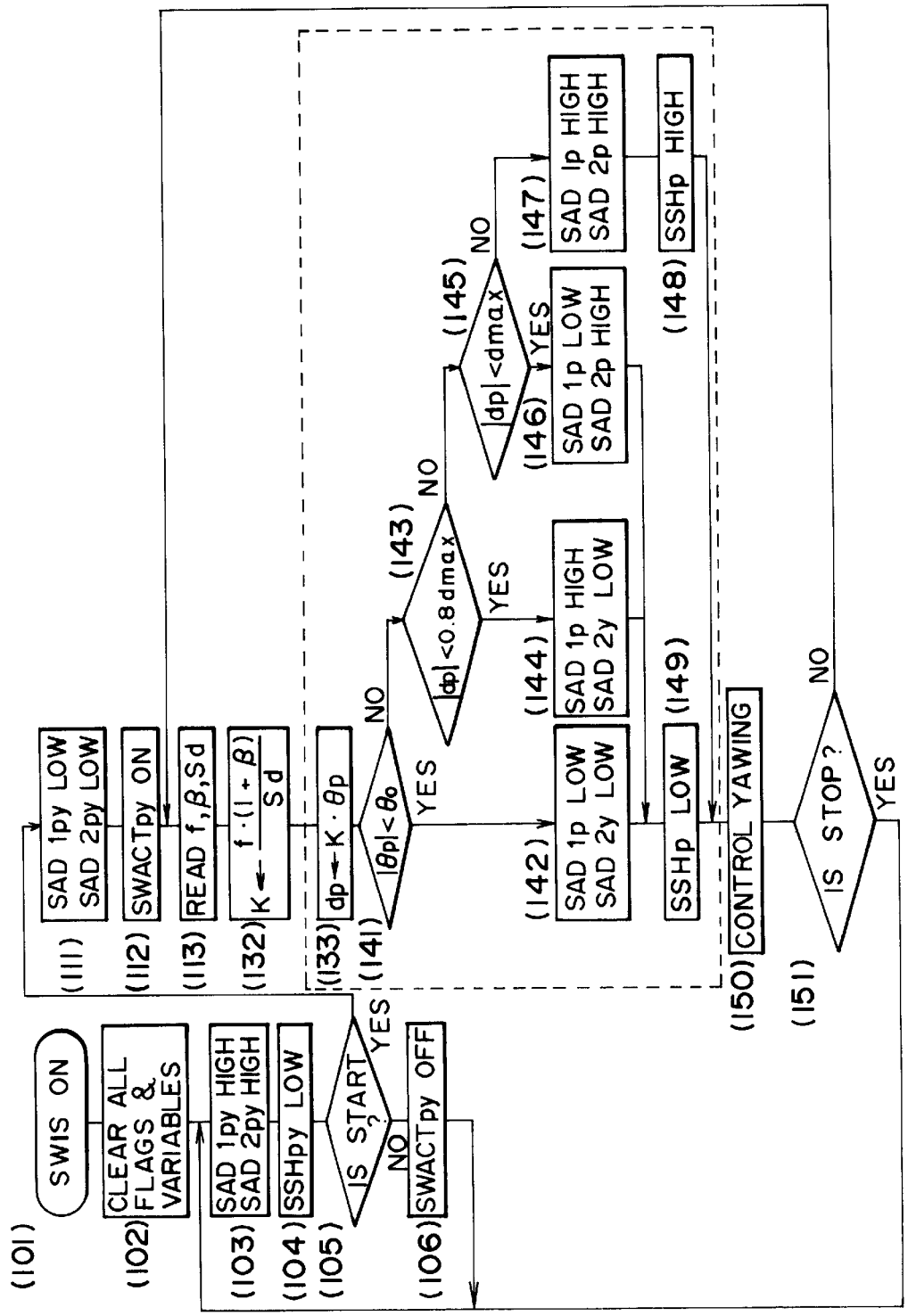
FIG. 14 is a flowchart showing an image stabilizing operation at the lens side of a camera comprising an apparatus according to the third embodiment of the present invention.

In FIG. 14, since steps (101) to (113) and (131) to (133) are the same as those in the second embodiment, step (141) and subsequent steps will be described below.

In steps (133) to (149) surrounded by a broken line in FIG. 14, the image stabilization characteristics in the pitch direction of the correction optical system ILNS are changed.

In step (133), a vibration angle deviation $\theta_p$ is converted into a deviation control value $d_p$ of the correction optical system ILNS, and the control value is output to the sample-hold circuit $SH_p$.

In step (141), the absolute value of the current vibration angle $\theta_p$ in the pitch direction is compared with the first characteristic switching point $\theta_0$. If "$|\theta_p|<\theta_0$", the flow advances to step (142). In step (142), the control lines $SAD1_p$ and $SAD2_p$ of the two switches SWAD1 and SWAD2 of the angle deviation detector $AD_p$ are set at low level. More specifically, in this step, the vibration detection characteristics of the amplitude rate 1 in FIG. 13A are selected. Thereafter, in step (149), the control line $SSH_p$ is set at low level to set the sample-hold circuit $SH_p$ in a through state so as to allow the signal $d_p$ to pass through the sample-hold circuit $SH_p$, thus performing image stabilization.

If it is determined in step (141) that "$|\theta_p|\geq\theta_0$", the flow advances to step (143). In step (143), the deviation control value $|d_p|$ of the correction optical system ILNS is compared with the third characteristic switching point 0.8 dmax. If "$|d_p|<0.8$ dmax", the flow advances to step (144). In step (144), the control line $SAD1_p$ is set at high level, and the control line $SAD2_p$ is set at low level, thereby selecting the characteristics of the amplitude rate 2 shown in FIG. 13A. Thereafter, the flow advances to step (149).

If it is determined in step (143) that "$|d_p|\geq 0.8$ dmax", the flow advances to step (145). In step (145), the deviation control value $|d_p|$ is compared with the second characteristic switching point dmax. If "$|d_p|<$dmax", the flow advances to step (146). In step (146), the control line $SAD1_p$ is set at low level, and the control line $SAD2_p$ is set at high level, thereby selecting the characteristics of the amplitude rate 3 shown in FIG. 13A. Thereafter, the flow advances to step (149).

If it is determined in step (145) that "$|d_p|\geq$dmax", since the deviation of the correction optical system ILNS is saturated, the flow advances to step (147). In step (147), the control lines $SAD1_p$ and $SAD2_p$ are set at high level to select the characteristics of the amplitude rate 4 in FIG. 13A, thereby maximizing the restoring force of the vibration signal $\theta_p$. Thereafter, in step (148), the control line $SSH_p$ is set at high level to enable the sample-hold circuit $SH_p$. Thus, the control deviation $d_p$ is fixed, and the image stabilizing operation is interrupted.

In FIG. 13A, the second and third characteristic switching points are defined by the vibration angle deviations $\theta$max and $\theta_1$ (=$0.8\cdot\theta$max) at the object field side. On the other hand, in steps (145) and (143) in the flow shown in FIG. 14, the angle deviations dmax and 0.8 dmax of the correction optical system ILNS corresponding to θmax and θ₁ are used. These numerical values indicate the same meanings, and either set may be used as the numerical values of the characteristic switching points.

In steps (133) to (149) surrounded by the broken line, the control in the pitch direction is performed. In step (150), the same control as described above is performed in the yaw direction. In FIG. 14, a detailed description of this control is omitted, and is represented by step (150).

In step (151), it is checked if the IS stop command is received from the camera main body CMR. If NO in step (151), the flow returns to step (113) to continue image stabilization in the pitch and yaw directions; otherwise, the flow returns to step (103), and the image stabilizing operation is stopped in step (106). Since the flow in steps (113) to (151) is repetitively executed at a cycle as short as several msec, a camera vibration having a frequency band of about 1 to 10 Hz can be sufficiently stabilized.

With the above-mentioned flow, when the vibration amplitude is equal to or smaller than the first characteristic switching point, the camera vibration priority image stabilization characteristics are obtained. When the vibration amplitude is present between the first and second characteristic switching points, the image stabilization characteristics which can perform camera vibration stabilization without disturbing, e.g., a panning operation are selected. When the vibration amplitude exceeds the second characteristic switching point, image stabilization is interrupted, and return of a vibration signal is quickened.

Even when the possible image stabilization range (angle) varies upon a zooming operation, the first characteristic switching point is left unchanged, and the second characteristic switching point changes according to the variation.

In the third embodiment, the possible image stabilization range (angle) of the image stabilizing apparatus is sufficiently larger than a normal camera vibration amplitude, and hence, the second characteristic switching point is always larger than the first characteristic switching point. However, when the possible image stabilization range is not so widened due to optical or mechanical limitations, or when a camera is designed for a beginner, and a considerably large camera vibration amplitude is assumed, the relationship between the first and second characteristic switching points must often be reversed upon, e.g., zooming.

The fourth embodiment to be described below is embodied in consideration of the above situation.

Figure 15:
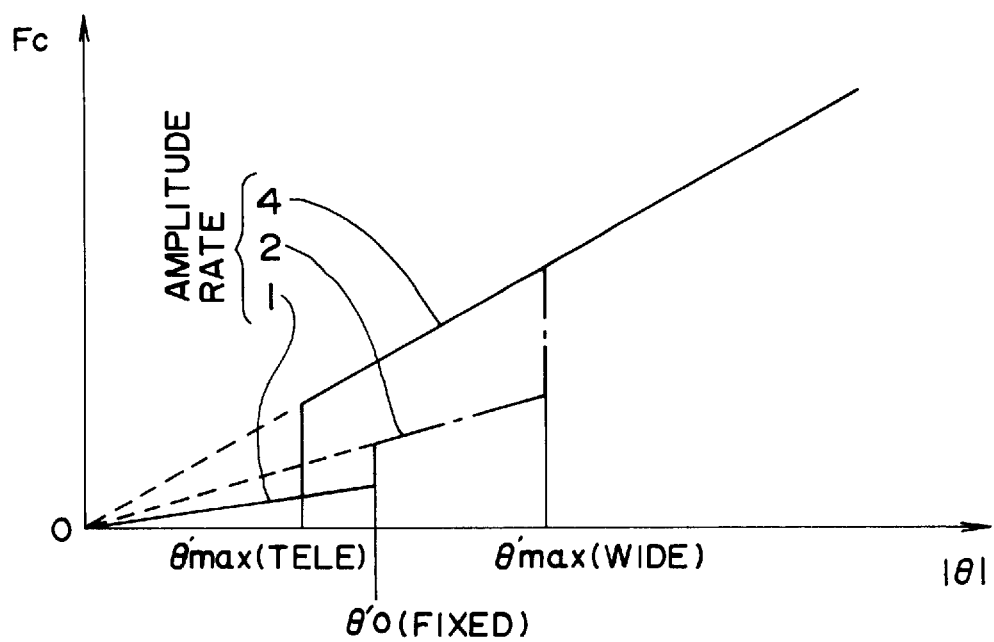
FIG. 15 is a graph for explaining the effect according to the fourth embodiment of the present invention.

FIG. 15 is a graph for explaining the effect of the fourth embodiment of the present invention.

FIG. 15 has the same coordinate system as in FIG. 13A of the third embodiment. In this embodiment, a first characteristic switching point $\theta'_0$ is set to be larger than $\theta_0$ in the third embodiment. On the other hand, θ'max as the second switching point is smaller than that in the third embodiment. Therefore, a value θ'max (Tele) at the telephoto-end is smaller than θ ₀. Restoring forces of the angle deviation detector AD in respective regions are set, as shown in FIG. 15. More specifically, since the possible image stabilization angle θ'max is smaller than $\theta'_0$ at the telephoto-end, image stabilization characteristics for performing image stabilization during a panning operation cannot be obtained. Thus, as indicated by a solid line in FIG. 15, only the second characteristic switching point θ'max (Tele) is effective. On the other hand, at the wide-end, the first and second characteristic switching points are effective like in the third embodiment, as indicated by an alternate long and short dashed line. In this embodiment, no third characteristic switching point is used.

Figure 16:
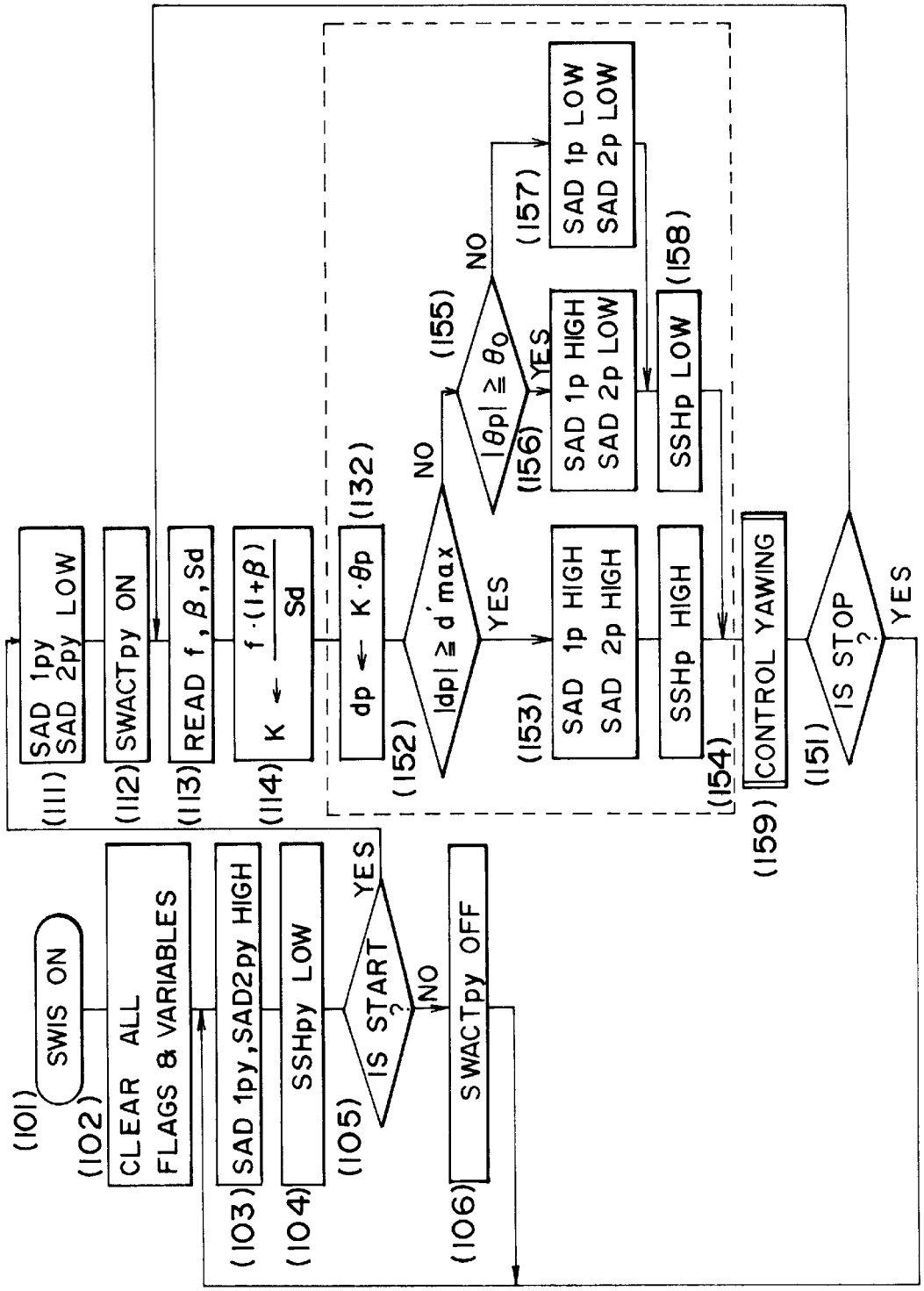
FIG. 16 is a flowchart showing an image stabilizing operation at the lens side of a camera comprising an apparatus according to the fourth embodiment of the present invention.

FIG. 16 is a flowchart showing the operation of the fourth embodiment. Since steps (141) to (150) shown in the flow chart of FIG. 14 of the third embodiment are changed to steps (152) to (159), only these steps will be described below.

Steps (133) to (158) are control steps in the pitch direction.

In step (133), a control deviation $d_p$ in the pitch direction of the correction optical system ILNS is calculated, and the flow advances to step (152).

In step (152), the absolute value of the control deviation $d_p$ is compared with a maximum deviation d'max as the second characteristic switching point. If "$|d_p| \geq d'max$", the flow advances to step (153).

In step (153), the control lines $SAD1_p$ and $SAD2_p$ of the angle deviation detector $AD_p$ are set at high level, thereby selecting the characteristics of an amplitude rate 4 in FIG. 15. Subsequently, in step (154), the control line $SSH_p$ is set at high level to enable the sample-hold circuit $SH_p$, thus latching the control signal $d_p$. More specifically, the image stabilizing operation is interrupted.

If it is determined in step (152) that "$|d_p| < d'max$", the flow advances to step (155).

In step (155), a vibration angle $|\theta_p|$ in the pitch direction is compared with the first characteristic switching point $\theta'_0$. If "$|\theta_p| \geq \theta'_0$", the control line $SAD1_p$ is set at high level, and the control line $SAD2_p$ is set at low level in step (156), thus obtaining the characteristics of an amplitude rate 2 in FIG. 15. Subsequently, in step (158), the control line $SSH_p$ is set at low level to allow the control deviation $d_p$ to pass through the sample-hold circuit, thus continuing the image stabilizing operation.

If it is determined in step (155) that "$|\theta_p| < \theta'_0$", the control lines $SAD1_p$ and $SAD2_p$ are set at low level in step (157) to obtain the characteristics of an amplitude rate 1 in FIG. 15. Thereafter, step (158) is executed.

In steps (133) to (158) surrounded by a broken line, control in the pitch direction is performed. In step (159), the same control as described above is performed in the yaw direction.

In the fourth embodiment with the above-mentioned flow, when the second characteristic switching point is larger than the first characteristic switching point, predetermined operations for changing the image stabilization characteristics are performed based on the first and second switching points. On the other hand, when the first characteristic switching point is larger than the second characteristic switching point, only an operation for changing the image stabilization characteristics based on the second characteristic switching point is performed.

In the third and fourth embodiments, when the possible image stabilization range (angle) varies upon zooming, the first image stabilization characteristic switching point is left unchanged, i.e., constant, and the second characteristic switching point changes in accordance with a change in possible image stabilization range.

However, the first characteristic switching point may be slightly changed according to a zooming operation. This is because when a photographer uses the wide-side, he or she tends to hold a camera with less care than for the telephoto-side, and the camera vibration amplitude is slightly increased.

In this case, for example, the first characteristic switching point is given by:

$$\theta_{0f} = \theta_{0r}\{1 - \alpha + \alpha \cdot (f_{Tele}/f)\}$$

where $\theta_{0T}$: the first characteristic switching point at the telephoto-end $\theta_{0f}$: the first characteristic switching point at the focal length f If α is selected to have a proper value, e.g., "α=0.15", "$\theta^{0f}=\theta^{0T}$" at the telephoto-end, and "$\theta_{0f}=1.3\ \theta_{0T}$" at the wide-end.

Similarly, the second characteristic switching point is given by:

$$\theta^{2f}=\theta^{2T}\{1-\gamma+\gamma\cdot(f_{Tele}/f)\}$$

where $\theta^{2T}$: the second characteristic switching point at the telephoto-end $\theta^{2f}$: the second characteristic switching point at the focal length f For example, if "γ=0.3", "$\theta^{2f}=\theta^{2T}$" at the telephoto-end, and "$\theta^{2f}=1.60_{2T}$" at the wide-end. Thus, a large change rate than $\theta_{0f}$ can be obtained.

Figure 17:
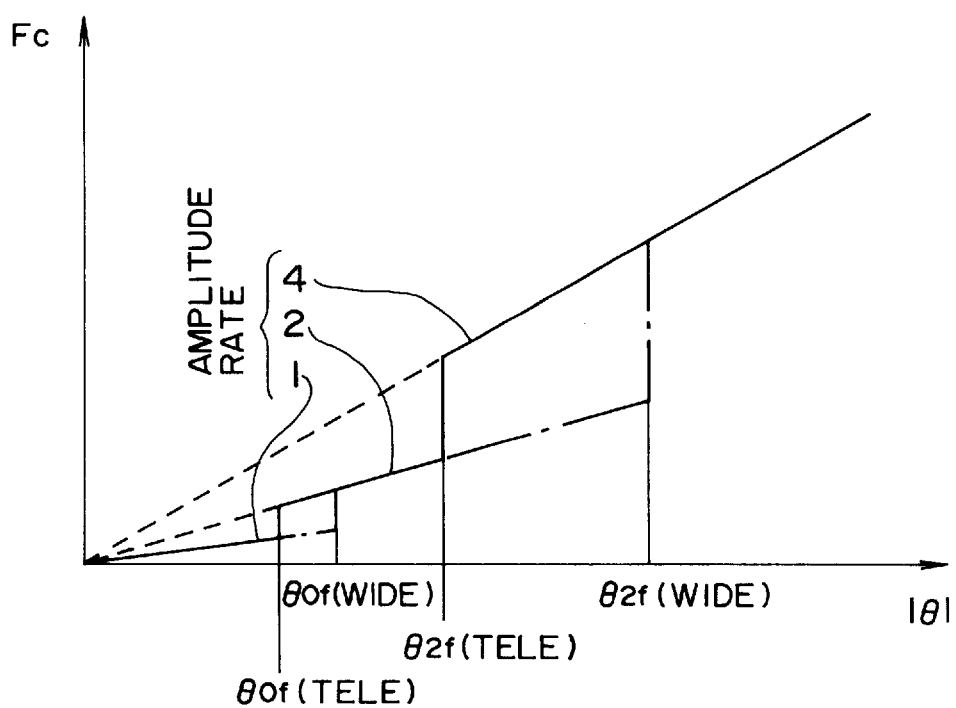
FIG. 17 is a graph for explaining the effect according to the fifth embodiment of the present invention.

FIG. 17 is a graph for explaining the effect of the fifth embodiment. Like in FIGS. 13 and 15, a solid line represents the angle deviation detector characteristics at the telephoto-end, and an alternate long and short dashed line represents the characteristics at the wide-end.

Figure 18:
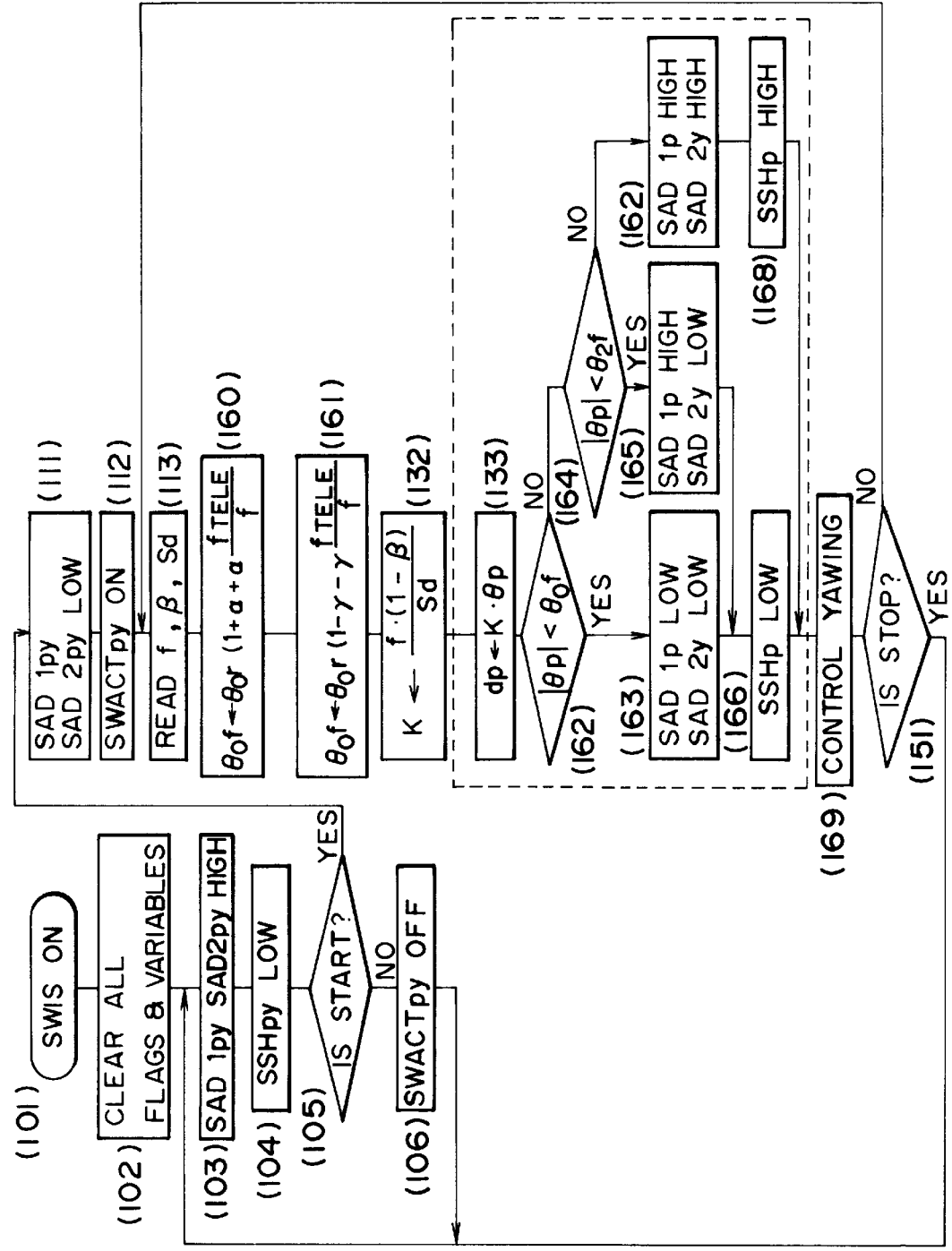
FIG. 18 is a flowchart showing an image stabilizing operation at the lens side of a camera comprising an apparatus according to the fifth embodiment of the present invention.

FIG. 18 is a flow chart showing the operation according to the fifth embodiment of the present invention. In FIG. 14 of the third embodiment, steps (160) and (161) are added between steps (113) and (132), and steps (141) to (150) are replaced with steps (162) to (169). Thus, only changed steps will be described below.

In steps (160) and (162), the above-mentioned first and second characteristic switching points $\theta_{0f}$ and $\theta_{2f}$ are calculated. In steps (132) and (133), k and $d_p$ are calculated, and the flow advances to step (162).

In step (162), the vibration angle deviation $|\theta_p|$ is compared with the first characteristic switching point $\theta_{0f}$. If $|\theta_p|<\theta_{0f}$, the flow advances to step (163) to select the characteristics of an amplitude rate 1 shown in FIG. 17. In step (166), the image stabilizing operation is continued.

If it is determined in step (162) that "$|\theta_p|\geq\theta_{0f}$", the flow advances to step (164).

In step (164), the vibration angle deviation $|\theta_p|$ is compared with the second characteristic switching point $\theta_{2f}$. If "$|\theta_p|<\theta_{2f}$", the flow advances to step (165) to select the characteristics of an amplitude rate 2 shown in FIG. 17. Thereafter, the flow advances to step (166) to continue the image stabilizing operation.

If it is determined in step (164) that "$|\theta_p|\geq\theta^{2f}$", the flow advances to step (167) to select the characteristics of an amplitude rate 4 shown in FIG. 17, thereby strengthening the restoring force of a vibration signal. In step (168), the control line $SSH_p$ is set at high level to hold the deviation signal $d_p$, thus interrupting the image stabilizing operation.

In steps (133) to (168), control in the pitch direction is performed. In step (169), the same control as described above is performed in the yaw direction.

In the above-mentioned flow, the first and second characteristic switching points $\theta_{0f}$ and $\theta_{2f}$ change according to the zooming operation. In this case, since the change rate of the first switching point $\theta_{0f}$ is small, and the change rate of the second switching point $\theta^{2f}$ is large, image stabilization characteristics suitable for all the cases, i.e., a case of only a camera vibration, a case of a small panning operation amount, and a case of a large panning operation amount, can be obtained.

According to the third to fifth embodiments, the image stabilizing apparatus comprises a characteristic varying means for varying image stabilization characteristics of the image stabilizing apparatus, and a threshold value setting means for controlling the characteristic varying means. The threshold value setting means has at least a first threshold value for discriminating a camera vibration or a panning operation, and a second threshold value for discriminating whether or not an image stabilizing operation can be continued. The image stabilization characteristics are switched according to these two threshold values, thereby improving operability in the panning operation without impairing camera vibration stabilization performance. When the image stabilization range at the object field side changes upon zooming of the photographing optical system, the first threshold value is set to be substantially constant, and the second threshold value is set to change according to a change in stabilization range. For this reason, optimal image stabilization characteristics can be obtained in any of the following cases:

when only a camera vibration occurs;

when a slow panning operation is performed; and when an abrupt panning operation is performed.

In the third to fifth embodiments, the angle deviation detector is used as a vibration detection means. However, an angular accelerometer or an angular speedometer may be used as the vibration detection means, as a matter of course. As for the angular accelerometer, the present applicant has already proposed it as Japanese Laid-Open Patent Application No. 2-165058, and as the angular speedometer, a vibration gyro or an optical fiber gyro is known. When a change amount in vibration is used as a control amount of image stabilization using these sensors, an integrator for converting an angular acceleration or an angular speed as the output signal from the sensor into an angle deviation is required. Thus, when the integration time constant of the integrator is switched, the same effects as in the third to fifth embodiments can be obtained. When the angular accelerometer or the angular speedometer is used, a high-pass filter is normally used for removing a drift component of the output signal from the sensor. In this case, the same effect as in switching of the integration time constant may be easily obtained by changing the cutoff frequency of the filter.

In the third to fifth embodiments, some lens groups of the photographing optical system are shifted in a direction perpendicular to the optical axis to perform image stabilization. When this operation is practiced using a variable vertical angle prism, the same effect as described above can be obtained. The variable vertical angle prism is proposed in Japanese Laid-Open Patent Application No. 2-59718, and the like by the present applicant, and performs image stabilization by inclining the optical axis in such a manner that a liquid is sealed between two plane-parallel glass plates, and the relative angle between the two glass plates is changed to provide a variable vertical angle prism effect. When the prism is arranged in the photographing optical system, a constant of proportion between the deviation angle of the prism and the image stabilization angle changes upon zooming, and the possible image stabilization range varies. Therefore, when the flows of the third to fifth embodiments are applied to driving control of the prism, the same effect as described above can be obtained.

The sixth embodiment of the present invention will be described below with reference to FIG. 19.

Figure 19:
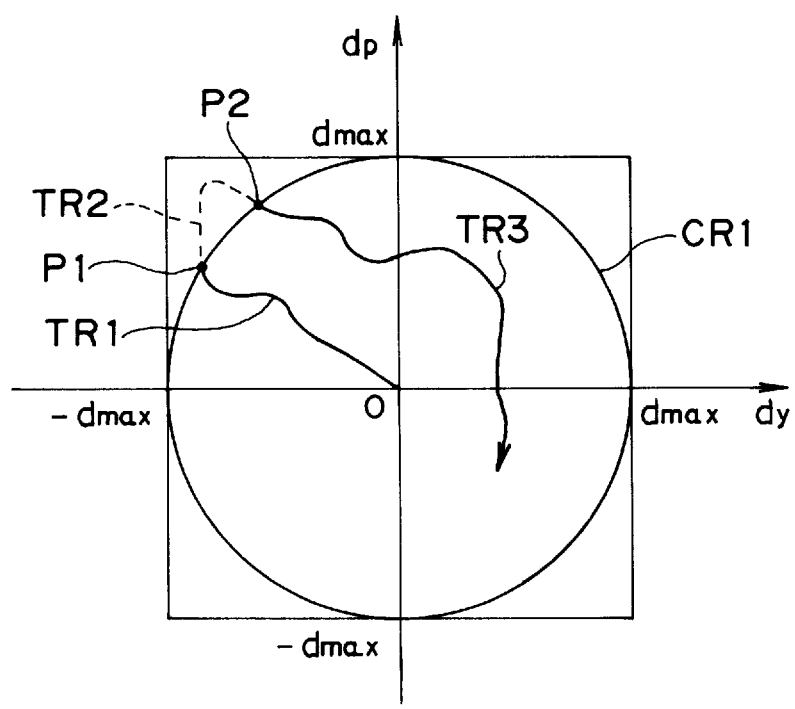
FIG. 19 is a graph for explaining the effect according to the sixth embodiment of the present invention.

FIG. 19 is a graph for explaining a deviation of the correction optical system ILNS. The vertical deviation for stabilizing a pitch vibration is plotted along the ordinate, and the horizontal deviation for stabilizing a yaw vibration is plotted along the abscissa. These deviations correspond to the directions of arrows 42p and 42y in FIG. 4, and are respectively represented by $d_p$ and $d_y$. A portion inside a circle having the origin O as the center and a radius dmax corresponds to the movable range of the correction optical system ILNS. More specifically, the correction optical system ILNS can solely deviate up to ±dmax in the $d_p$ or $d_y$ direction. However, in an oblique direction, the deviation of the correction optical system ILNS is restricted at a position of an equal interval dmax from the origin O, and $d_p$ and $d_y$ cannot reach ±dmax.

Traces TR1, TR2, and TR3 are those of the correction optical system ILNS during execution of the image stabilizing operation of this embodiment. When the image stabilizing operation is started, the correction optical system ILNS starts its driving operation from the origin O, and deviates, as indicated by the trace TR1. When the correction optical system ILNS reaches a circle CR1, although the optical system should be originally driven, as indicated by the trace TR2, the driving operation is stopped during this interval, and the optical system stands by at a point P1 in the present invention. When a deviation signal to be controlled returns into the circle CR1, the correction optical system ILNS is moved from the point P1 to a point P2, and is then controlled, as indicated by the trace TR3.

The operation of the camera main body CMR of this embodiment is the same as that in the first embodiment, and the camera main body CMR operates according to the flow shown in FIG. 6.

Figure 20:
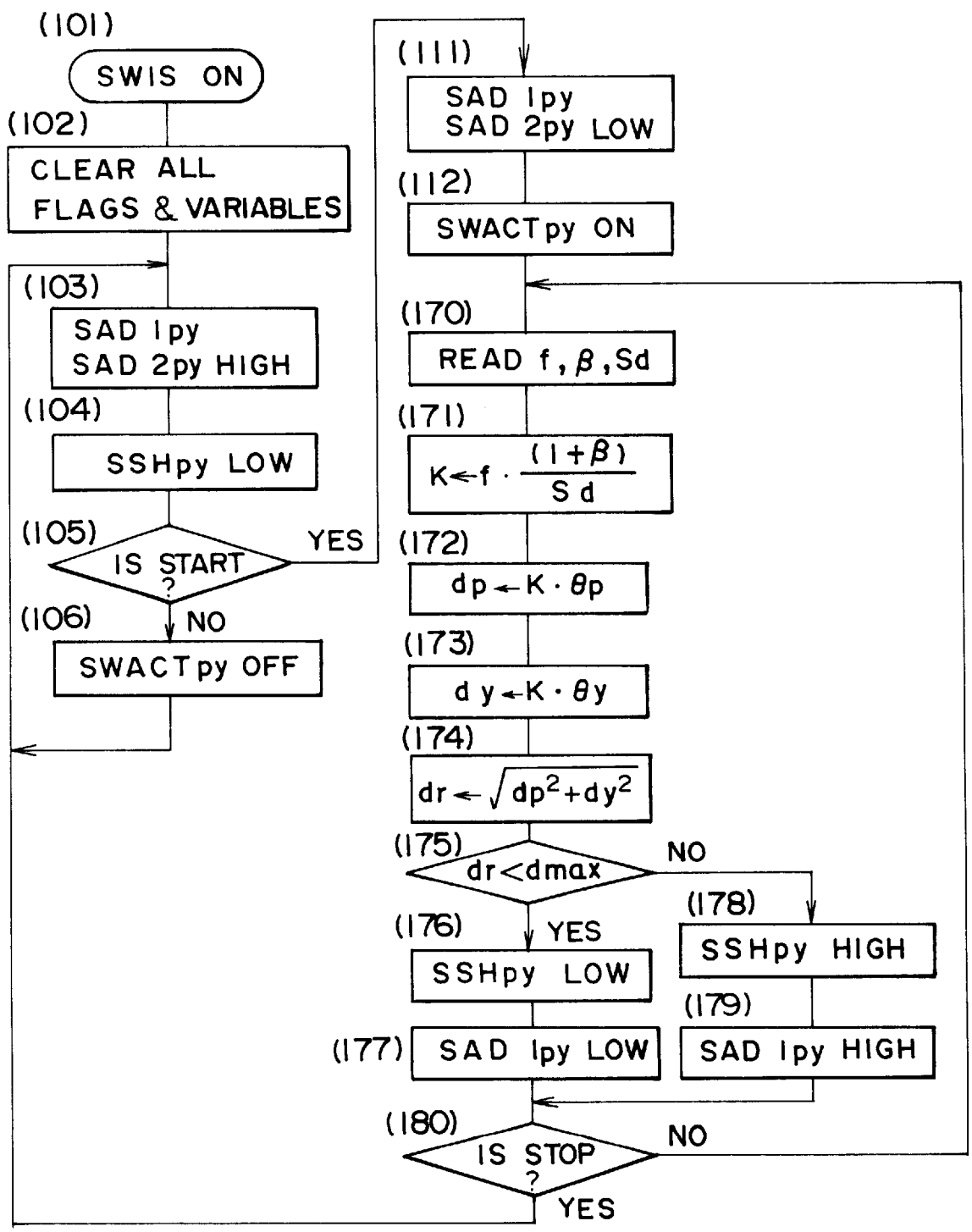
FIG. 20 is a flowchart showing an image stabilizing operation at the lens side of a camera comprising an apparatus according to the sixth embodiment of the present invention.

The image stabilizing operation performed at the lens LNS side will be described below with reference to the flow chart shown in FIG. 20. In each step, a reference symbol added with a suffix py indicates that operations in the pitch and yaw directions are sequentially performed in the step. Since steps (101) to (112) are the same as those in the first embodiment, subsequent steps will be described below.

In step (111), the control lines $SAD1_{py}$ and $SAD2_{py}$ are set at low level, thus setting the vibration detection characteristics of the angle deviation detectors $AD_{py}$ in a camera vibration stabilizing enable state. In step (112), the switches $SWACT_{py}$ are turned on to start the image stabilizing operation.

In step (170), the states of the encoders ENCZ and ENCB for respectively detecting the zoom ring position and the focusing lens position are detected, and a focal length f, a photographing magnification β, and a decentering sensitivity $S_d(f, β)$ at that time are read out from data stored in the ROM on the basis of the output information of the encoders.

The decentering sensitivity $S_d$ represents the ratio of an image deviation $d_{IM}$ to a deviation $d_L$ of the correction optical system ILNS, as has been described above in the description of equation ②, and is given by:

$$S_d = d_{IM}/d_L$$

The decentering sensitivity $S_d$ is a function of the focal length f and the focusing lens position, i.e., the photographing magnification β. Thus, the sensitivity $S_d$ is stored in the ROM as matrix data $S_d(f, β)$, and is read out from the ROM according to information from the encoders ENCZ and ENCB.

In step (171), a coefficient k for converting a vibration angle θ in equation ④ described above into a control deviation d of the correction optical system ILNS is calculated. In step (172), a vibration angle deviation $θ_p$ in the pitch direction is converted into a control deviation $d_p$ of the correction optical system, and the control deviation is input to the input terminal of the sample-hold circuit $SH_p$. In step (173), the same operation as in step (172) is performed in the yaw direction.

In step (174), a deviation of the correction optical system ILNS from the origin is calculated, and is stored in dr. In step (175), the deviation dr is compared with an allowable deviation dmax. If "dr<dmax", i.e., if the deviation of the correction optical system falls within the circle CR1 shown in FIG. 19, the flow advances to step (176) to continue the image stabilizing operation. In step (176), the control lines $SSH_p$ and $SSH_y$ are set at low level to disable the sample-hold circuits $SH_p$ and $SH_y$ so as to allow the signals $d_p$ and $d_y$ to pass through the corresponding sample-hold circuits. In step (177), the control lines $SAD1_p$ and $SAD1_y$ are set at low level to set the vibration detection characteristics of the angle deviation detectors $AD_p$ and $AD_y$ in a camera vibration stabilizing state. More specifically, in steps (176) and (177), a normal image stabilizing operation is performed.

If it is determined in step (175) that "dr≧dmax", i.e., if the deviation of the correction optical system ILNS is about to fall outside the circle CR1 in FIG. 19, the flow advances to step (178), and the control lines $SSH_p$ and $SSH_y$ are set at high level. Thus, the outputs from the sample-hold circuits $SH_p$ and $SH_y$ are fixed to the input values at that time. Therefore, the deviation of the correction optical system ILNS is fixed at the point P1 on the circle CR1 shown in FIG. 19, and the image stabilizing operation is interrupted.

In step (179), the control lines $SAD1_p$ and $SAD1_y$ are set at high level to give high-pass characteristics to the angle deviation detectors $AD_p$ and $AD_y$, thus helping their output signals $d_p$ and $d_y$ to quickly return to zero so as to restart the image stabilizing operation.

After step (177) or (179) is executed, the flow advances to step (180).

In step (180), it is checked if the IS stop command is received from the camera main body CMR. If NO in step (180), the flow returns to step (170), and the flow in steps (170) to (179) is executed.

If the state of "dr<dmax" is restored again in step (175) during execution of the above-mentioned flow, the flow in steps (176) and (177) is executed to restart the normal image stabilizing operation. At this time, the deviation of the correction optical system ILNS is immediately moved from the point P1 to the point P2 in FIG. 19, and the image stabilizing operation is performed from the point P2 according to the trace TR3.

If it is determined in step (180) that the IS stop command is transmitted from the camera main body CMR, the flow returns to step (103), and the image stabilizing operation is stopped in step (106).

Since the flow in steps (170) to (180) is repetitively executed at a cycle as short as several msec, a camera vibration having a frequency band of about 1 to 10 Hz can be sufficiently stabilized.

In the sixth embodiment, the movable range of the correction optical system ILNS is defined by a portion inside the circle having the origin O as the center. However, regions having various other patterns may be set, and this will be described below as the seventh embodiment.

Figure 21:
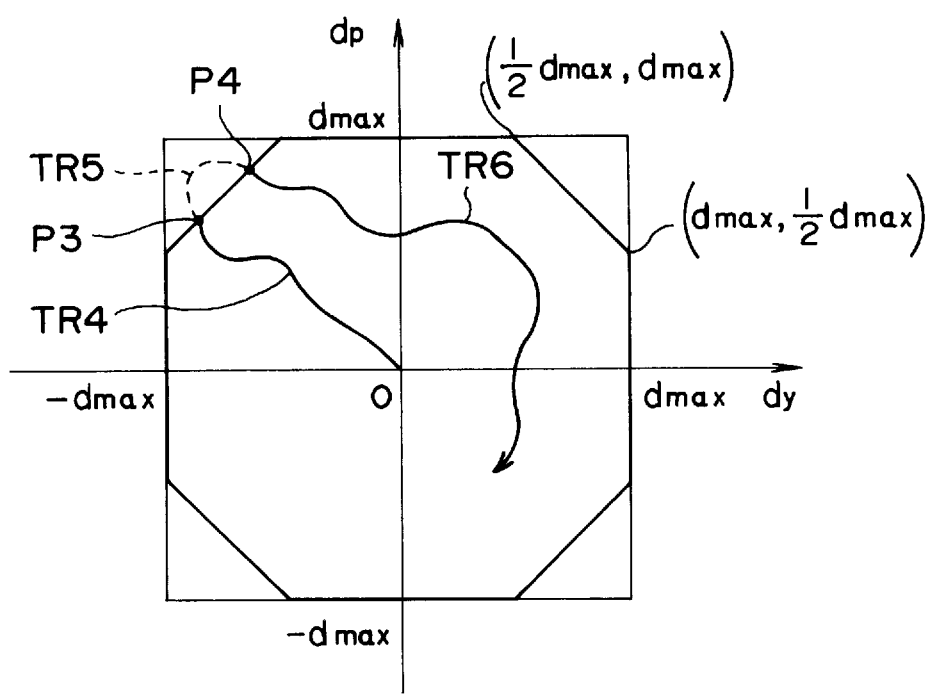
FIG. 21 is a graph for explaining the effect according to the seventh embodiment of the present invention.

FIG. 21 is a graph for explaining the effect of the seventh embodiment of the present invention, and has the same coordinate axes as in FIG. 19.

As shown in FIG. 21, the movable range of the correction optical system ILNS is defined by a portion inside an octagon, and conditions for satisfying this region are:

$|d_p|<dmax$ and $|d_y|<dmax$ and $|d_p|+|d_y|<(3/2)dmax$

Figure 22:
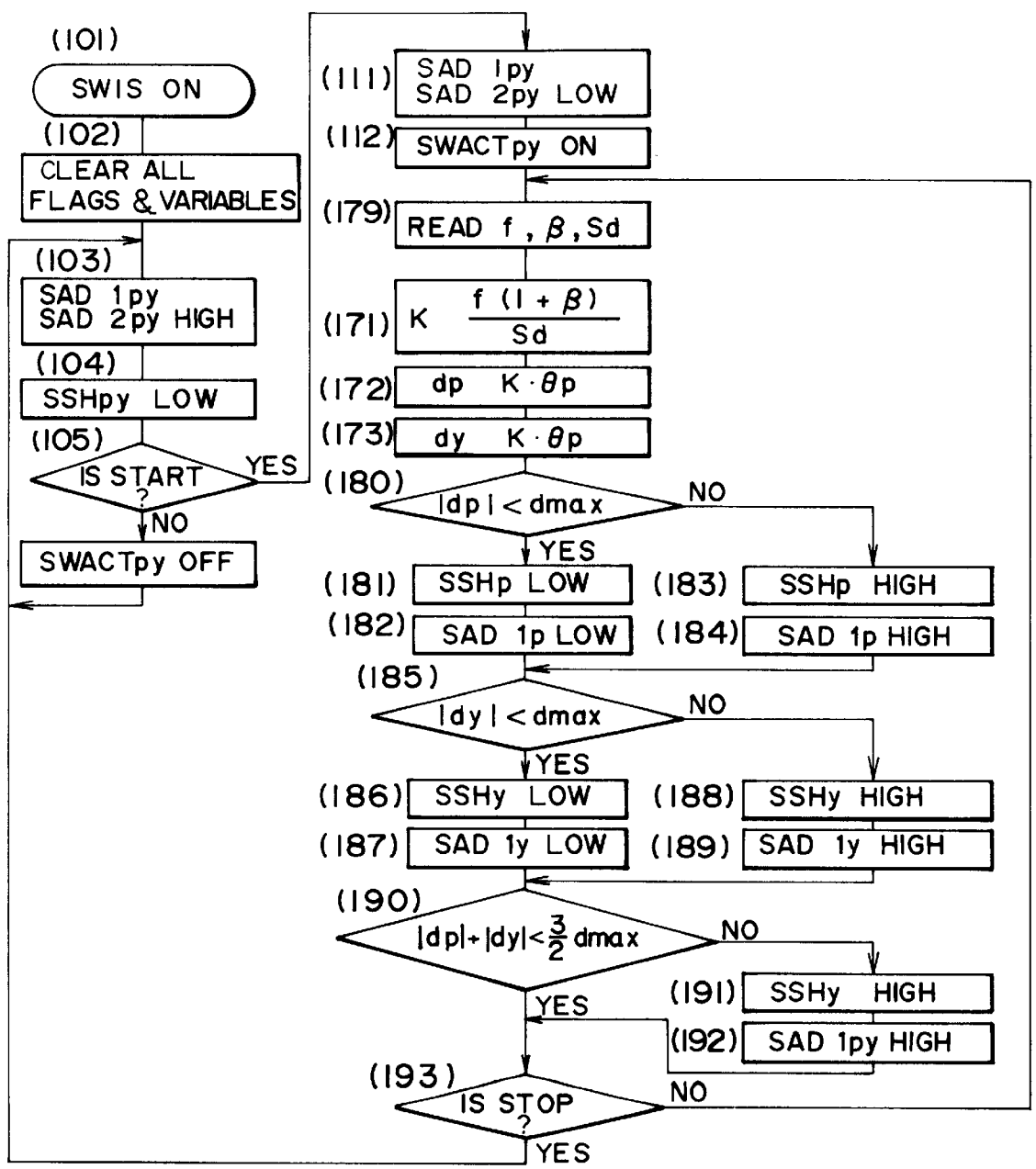
FIG. 22 is a flowchart showing an image stabilizing operation at the lens side of a camera comprising an apparatus according to the seventh embodiment of the present invention.

FIG. 22 is a flow chart showing a control operation according to the seventh embodiment. In FIG. 22, step (174) and subsequent steps in FIG. 20 of the sixth embodiment are replaced with step (180) and subsequent steps. Therefore, these replaced steps will be described below.

In FIG. 22, control deviations $d_p$ and $d_y$ in the pitch and yaw directions are calculated in steps (172) and (173). Thereafter, in steps (180) to (184), the deviation in the pitch direction is regulated.

In step (180), the deviation $d_p$ in the pitch direction is compared with an allowable deviation dmax. If "$|d_p|<$dmax", steps (181) and (182) are executed to continue a normal image stabilizing operation.

On the other hand, if "$|d_p|\geq$dmax", the image stabilizing operation in the pitch direction is interrupted in steps (183) and (184), and the high-pass characteristics of the angle deviation detector $AD_p$ are strengthened.

In steps (185) to (189), the same operations as in steps (180) to (183) are performed in the yaw direction.

The operation for interrupting the image stabilizing operation when the deviation is saturated in only the pitch or yaw direction has been described.

In step (190), "$|d_p|+|d_y|$" is compared with "(3/2)dmax". In this step, it is checked if the correction optical system ILNS is located inside or outside a 45° boundary line of the octagonal region at each of the four corners of a square circumscribing the octagon. If it is determined that the correction optical system ILNS is located inside the 45° line, no operation is performed, and the flow advances to step (193). On the other hand, if it is determined that the correction optical system ILNS is located outside the 45° line, the flow advances to step (191), and the sample-hold circuits $SH_p$ and $SH_y$ in the pitch and yaw directions are enabled to fix the deviation of the correction optical system ILNS, thereby interrupting the image stabilizing operation. In step (192), the high-pass characteristics of the angle deviation detectors $AD_p$ and $AD_y$ in the pitch and yaw directions are strengthened.

In step (193), it is checked if the IS stop command is input. If NO in step (193), steps (170) to (192) are repetitively executed; if YES in step (193), the flow returns to step (103) to stop the image stabilizing operation.

The effect of the above-mentioned flow will be described below with reference again to FIG. 21.

When the image stabilizing operation is started, the correction optical system ILNS moves along a trace TR4. When the correction optical system ILNS enters a region of a trace TR5, its deviation is fixed at a point P3 in steps (190), (191), and (192) in the flow shown in FIG. 22. When a control signal returns to a controllable region, the correction optical system ILNS immediately shifts from the point P3 to a point P4, and the driving control is restarted along a trace TR6.

In the sixth and seventh embodiments, while the deviation of the correction optical system is regulated, the image stabilizing operation is completely interrupted. Therefore, when the image stabilizing operation is restarted, for example, in the sixth embodiment shown in FIG. 19, since the correction optical system ILNS is immediately moved from the point P1 to the point P2, a photographer feels uneasy.

Thus, in the eighth embodiment of the present invention to be described below, when the deviation control signal of the correction optical system ILNS exceeds an allowable limit region, the correction optical system ILNS is continuously driven along the region.

Figure 23:
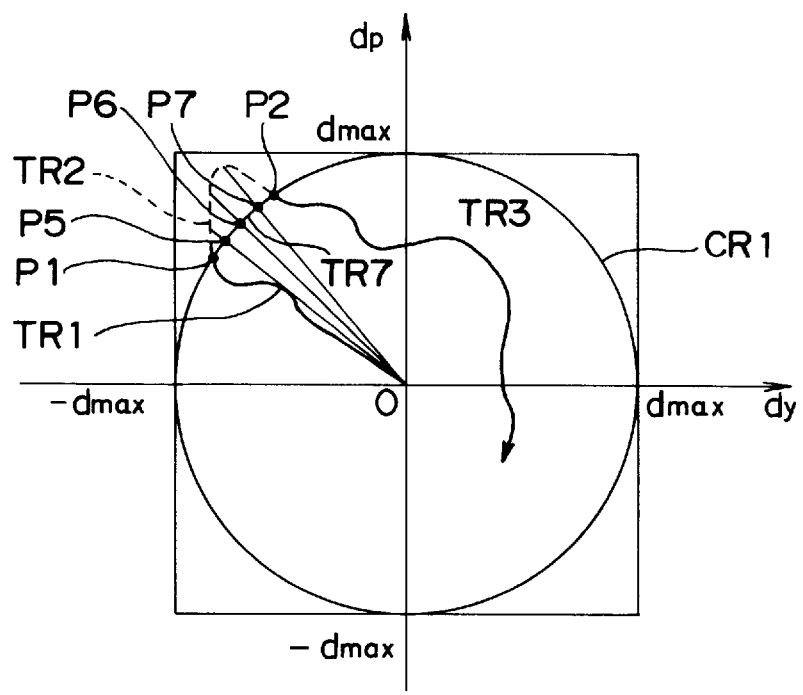
FIG. 23 is a graph for explaining the effect according to the eighth embodiment of the present invention.

FIG. 23 is a graph for explaining the effect of the eighth embodiment. The movable region of the correction optical system ILNS is a circle CR1 like in the sixth embodiment. When the control deviation trace of the correction optical system ILNS is present outside the circle CR1, i.e., corresponds to a trace TR2, the deviation of the correction optical system ILNS to be actually controlled is set to pass intersections with a perpendicular depending from the trace TR2 to the circle CR1, i.e., points P5, P6, and P7. Therefore, when a control command signal corresponds to the trace TR2, the correction optical system ILNS smoothly moves along an arc from the point P1 to the point P2 as an actual control trace.

Figure 24:
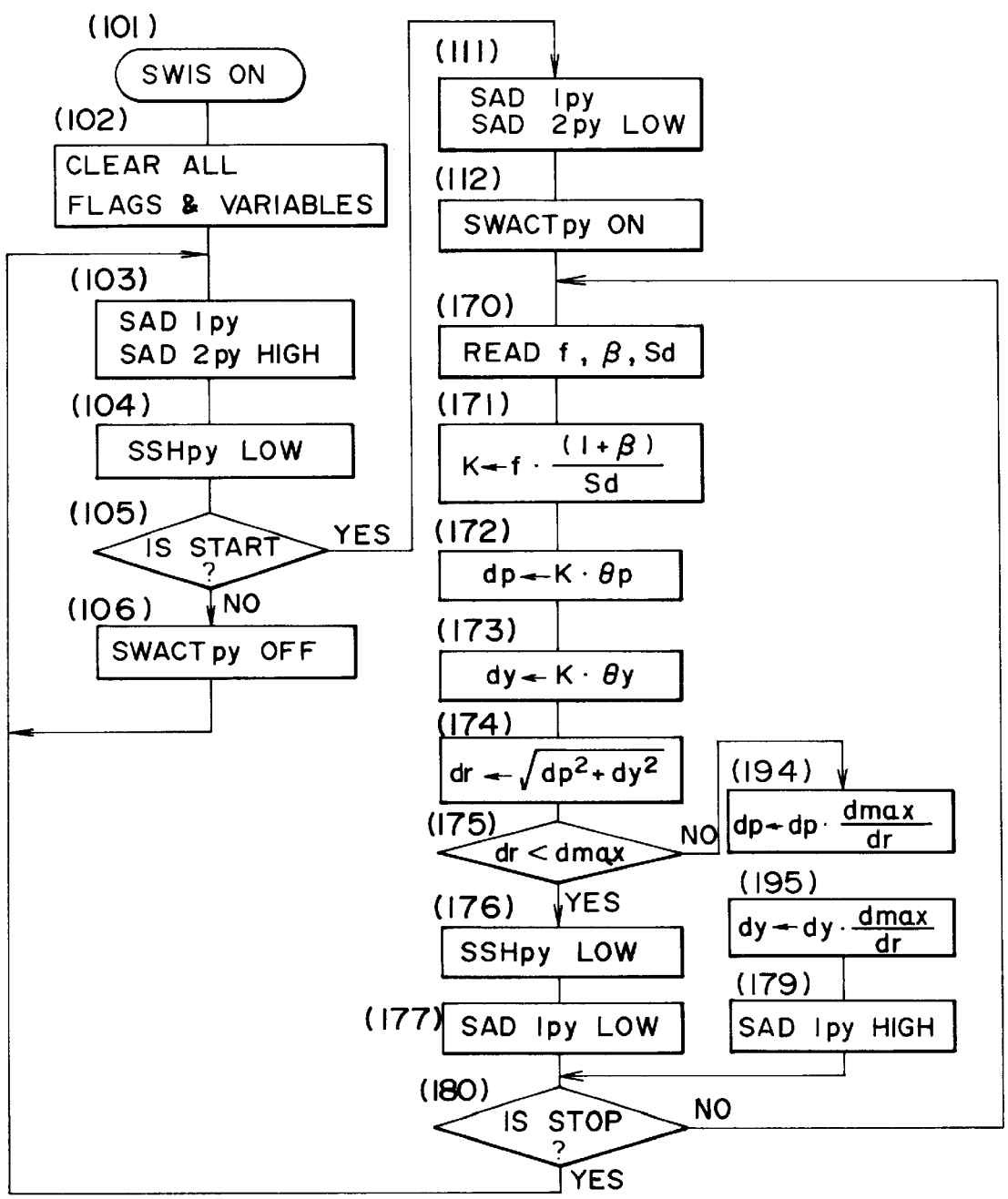
FIG. 24 is a flowchart showing an image stabilizing operation at the lens side of a camera comprising an apparatus according to the eighth embodiment of the present invention.

FIG. 24 is a flowchart showing a control operation of the eighth embodiment.

In this flow, step (178) in the flow shown in FIG. 20 of the sixth embodiment is replaced with steps (194) and (195), and only these steps will be described below.

In step (174), a deviation dr of the correction optical system ILNS from the origin O is calculated. If it is determined in step (175) that the deviation dr exceeds an allowable value dmax, the flow advances to step (194).

In steps (194) and (195), the coordinates of an intersection with a perpendicular depending from a point on the trace TR2 calculated in steps (172) and (173) to the circle CR1, i.e., the coordinates of an intersection between a line connecting the point on TR2 and the origin O, and the circle CR1 are calculated, and these coordinates are set as new deviation control values $d_p$ and $d_y$ in the pitch and yaw directions. Therefore, if the deviation control values calculated in steps (172) and (173) correspond to the trace TR2, the actual control trace of the correction optical system ILNS is defined by an arc TR7 (see FIG. 23) connecting P1, P5, P6, P7, and P2.

Therefore, the correction optical system ILNS is moved along TR1→TR7→TR3 during the image stabilizing operation. Thus, the correction optical system ILNS will not fall outside the circle CR1, and the image stabilizing operation will not be interrupted.

It is easy to provide the effect of the eighth embodiment to the seventh embodiment shown in FIG. 21. In this case, when the correction optical system ILNS is about to fall outside the octagonal allowable deviation region, an intersection with a perpendicular depending from the deviation control point to the opposing side of the octagon can be defined as an actual control point.

According to the sixth to eighth embodiments, in the correction optical system, which is independently supported and driven in the two-dimensional directions, the maximum deviation in the diagonal direction in a rectangular or square possible driving region of the correction optical system on the two-dimensional plane is regulated by a function of a deviation in a first direction and a deviation in a second direction, so as to prevent the correction optical system from excessively deviating. For this reason, an excessive deviation can be prevented in a region that does not participate in camera vibration stabilization. Thus, the following effects can be obtained:

(1) A lens barrel can be prevented from becoming unnecessarily large in size.

(2) Operability upon a panning or framing change operation can be improved.

(3) Generation of an excessive aberration can be prevented.

In the sixth to eighth embodiments, the correction optical system is prohibited from entering the diagonal regions of a two-dimensional driving region. In the ninth embodiment to be described below, a release operation is prohibited although the correction optical system is allowed to enter the diagonal regions, thereby suppressing generation of an aberration upon exposure.

Figure 25:
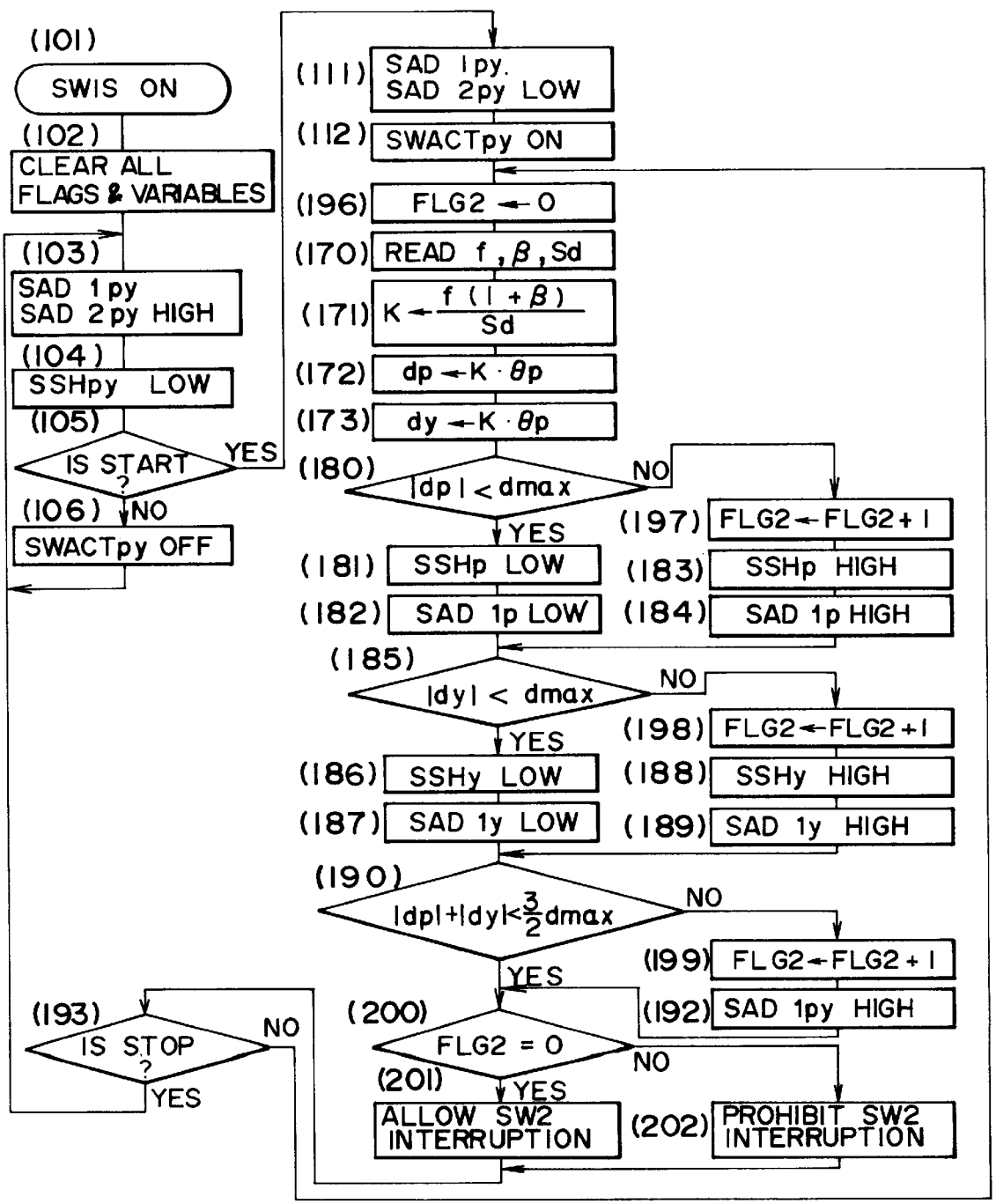
FIG. 25 is a flowchart showing an image stabilizing operation at the lens side of a camera comprising an apparatus according to the ninth embodiment of the present invention.

FIG. 25 is a flowchart showing an operation according to the ninth embodiment of the present invention. In FIG. 25, step (191) is omitted from the flow of the seventh embodiment shown in FIG. 22, and steps (196) to (202) are added. Thus, only the added steps will be explained below.

In step (196) next to step (112), a flag FLG2 for permitting/prohibiting an interruption of the switch SW2 is cleared to "0".

If "NO" is determined in step (180), "1" is added to the flag FLG2 in step (197). Similarly, if "NO" is determined in step (185), "1" is added to the flag FLG2 in step (198).

If "NO" is determined in step (190), the sample-hold circuits $SH_{py}$ are enabled to latch the position of the correction optical system in step (191) in the seventh embodiment. However, in this embodiment, the latch operation is not performed, and "1" is added to the flag FLG2 in step (199).

In step (200), the state of the flag FLG2 is checked. If "YES" is determined in all of steps (180), (185), and (190), this means that the correction optical system ILNS is normally subjected to the image stabilizing operation in the octagonal region shown in FIG. 21. At this time, since "FLG2=0", the flow advances to step (201), and a communication for permitting an interruption of the switch SW2 is made to the camera side. Thereafter, the flow returns to step (196) via step (193).

Therefore, when the switch SW2 is turned on during execution of this flow, the interruption operation in step (021) and subsequent steps in FIG. 6 is executed.

If "NO" is determined in even one of steps (180), (185), and (190), since "FLG2≧1", the flow advances to step (202), and a communication for prohibiting the interruption of the switch SW2 is made to the camera side. Therefore, in this case, even when the switch SW2 is turned on, the release operation is prohibited.

Therefore, in this embodiment, the correction optical system ILNS may enter the diagonal regions in FIG. 21, but the release operation in this state is prohibited, thereby preventing a photograph with a large aberration from being taken.

In the sixth to ninth embodiments, some lens groups of the photographing optical system are shifted in a direction perpendicular to the optical axis to perform image stabilization. When this operation is practiced using a variable vertical angle prism, the same effect as described above can be obtained. The variable vertical angle prism is proposed in Japanese Laid-Open Patent Application No. 2-59718, and the like by the present applicant, and performs image stabilization by inclining the optical axis in such a manner that a liquid is sealed between two plane-parallel glass plates, and the relative angle between the two glass plates is changed to provide a prism effect. A driving mechanism of the prism has a mechanism for independently supporting and driving the prism in the pitch and yaw directions so as to stabilize a vibration while decomposing it into pitch and yaw vibrations. Therefore, the same effect as described above can be obtained when the angle control value of the two glass plates of the prism is controlled according to the flows of the sixth to ninth embodiments.

As described above, according to the sixth to ninth embodiments of the present invention, a limiting means for, when the deviation of the correction optical system by two sets of driving means reaches a predetermined relationship, limiting driving deviations in two directions is arranged. In addition, a driving control means for, when the deviation of the correction optical system by the two sets of driving means reaches a first predetermined relationship, driving the two sets of driving means according to a signal obtained by synthesizing corresponding driving control signals in a second predetermined relationship is arranged. When deviations in first and second directions of the correction optical system reach the first predetermined relationship, the deviation of the correction optical system is limited, or is driven according to the signal obtained by synthesizing corresponding driving control signals in the second predetermined relationship, so that the correction optical system can move (deviate) within only a predetermined range. Therefore, a lens barrel can be prevented from becoming unnecessarily large in size, and generation of an excessive aberration can be prevented. In addition, operability upon a panning or framing change operation can be improved.

What is claimed is:

1. An image stabilizing apparatus, comprising:

image stabilization means for compensating image blur by moving in an optical path of the image stabilizing apparatus, said image stabilization means being movable in at least two different directions; and restriction means for restricting movement of said image stabilization means, wherein said restriction means becomes inoperable when a driving state of said image stabilization means does not satisfy a predetermined relationship of the two different directions, and becomes operable when the driving state satisfies said predetermined relationship, so that the driving state in said two different directions does not exceed the predetermined relationship.

2. An apparatus according to claim 1, wherein said restriction means comprises means for restricting movement of said image stabilization means so that said image stabilization means does not operate outside of the predetermined relationship when a difference in an amount of movement of said image stabilization means in the different directions reaches a boundary value of a predetermined range.

3. An apparatus according to claim 2, wherein said restriction means further comprises means for prohibiting movement of said image stabilization means when a difference in the amount of movement of said image stabilizing means in different direction reaches the boundary value of said predetermined range.

4. An apparatus according to claim 2, wherein said restriction means further comprises means for varying the operation of said image stabilizing means in accordance with the output of said image stabilization means when a difference in the amount of movement of said image stabilizing means in different direction reaches the boundary value of said predetermined range.

5. An apparatus according to claim 4, wherein said restriction means further comprises for starting said image stabilization means to operate at the boundary value of said predetermined range when a difference in the amount of movement of said image stabilizing means in different direction reaches the boundary value of said predetermined range.

6. An apparatus according to claim 2, wherein the predetermined range is determined in accordance with a position whose distance from a predetermined position is substantially less than or equal to a predetermined value.

7. An apparatus according to claim 6, wherein the predetermined position is set at a position of said image stabilization means when said image stabilization means does not deflect the light beam.

8. An apparatus according to claim 6, wherein the predetermined range is defined by a circle of a predetermined radius whose center is the predetermined position, the circle defining a boundary indicating the limit of movement of said image stabilization means in any direction away from the predetermined position.

9. An apparatus according to claim 6, wherein the predetermined range is defined by a polygon surrounding the predetermined position, the polygon defining a boundary indicating the limit of movement of said image stabilization means in any direction away from the predetermined position.

10. An apparatus according to claim 2, wherein said predetermined range is set in accordance with a transmitting state of a light beam for forming the image.

11. An apparatus according to claim 10, wherein said predetermined range is set so that it substantially corresponds to an area through which the light beam for forming the image is being transmitted.

12. An apparatus according to claim 1, wherein said restriction means further comprises means for restricting the movement of said image stabilization means so that the driving amount of said image stabilization means does not exceed a predetermined value when a difference in amount of movement of said image stabilizing in the different directions reaches a predetermined value.

13. An apparatus according to claim 1, further comprising deviation amount detection means for detecting the deviation amount of said image stabilizing means at least in said two different directions, said restriction means comprising means for restricting the movement of said image stabilizing means in response to an output of said deviation amount detection means.

14. An apparatus according to claim 1, further comprising memory means for storing the predetermined relationship and comparison means for comparing said predetermined relationship stored in said memory means with the driving state of said image stabilizing means in the two different directions.

15. An apparatus according to claim 1, wherein said image stabilizing means moves in a plane including said two different driving directions.

16. An apparatus according to claim 1, further comprising blur detection means for detecting image blur, first driving means for driving said image stabilizing means selectively in one of said two different directions in response to an output of said image blur detection means, and second driving means for driving said image stabilizing means in the other direction in response to an output of said blur detection.

17. A camera system, comprising:
image stabilization means for compensating for image blur by moving in an optical path of the camera system, said image stabilization means being movable in at least two different directions;
restriction means for restricting movement of said image stabilization means, wherein said restriction means becomes inoperable when a driving state of said image stabilization means in said two different directions does not satisfy a predetermined relationship and becomes operable when the driving state satisfies said predetermined relationship, so that the driving state in said two different directions does not exceed the predetermined relationship.

18. A camera system according to claim 17, wherein said restriction means includes means for restricting the movement of said image stabilization means so that said image stabilization means does not operate outside of the predetermined relationship of the two different directions and becomes operable, when the driving state satisfies said predetermined relationship, so that the driving state in said two different directions does not exceed the predetermined relationship.

19. An apparatus for use with an image shake prevention device which prevents image shake in accordance with an output of a fluctuation detection device which detects a fluctuation of an optical apparatus, comprising:
setting means for setting a driving amount of the image shake prevention device in accordance with the output of the fluctuation detection device; and
regulation means for regulating an output range of the fluctuation detection device within which the image shake prevention device responds, said regulation means regulating the output range independently of the driving amount set by said setting means.

20. An apparatus according to claim 19, wherein said setting means comprises means for changing the driving amount in accordance with a focal length, and said regulation means comprises means for changing the output range in accordance with a change in the driving amount set by said setting means.

21. An apparatus according to claim 20, wherein said setting means comprises means for making the driving amount smaller in accordance with the focal length being shortened, and said regulation means comprises means for making the output range smaller in accordance with said setting means making the driving amount smaller.

22. An apparatus according to claim 20, wherein said regulation means comprises means for determining the output range in accordance with the driving amount based on the focal length.

23. An apparatus according to claim 19, wherein said setting means comprises means for changing the driving amount in accordance with a change in a correspondence relationship between a fluctuation amount of the optical equipment and an image shake amount caused by the fluctuation amount, and said regulation means comprises means for changing the output range in accordance with a change of the driving amount by said setting means.

24. An apparatus according to claim 23, wherein said regulation means comprises means for changing the output range so that a range of the fluctuation of the optical equipment is substantially constant even when said setting means changes the driving amount in accordance with a change of the correspondence relationship, and wherein the image shake prevention device accommodates the range of the fluctuation of the optical equipment by means of an image shake prevention operation.

25. An apparatus according to claim 23, wherein said setting means is disposed in an optical path of a light for forming an image, in which an image shake in the image is being prevented by the image shake prevention device, and said setting means comprises means for changing the driving amount in accordance with a state of an optical portion in which an optical power is variable, and said regulation means comprises means for changing the output range in accordance with the change of the driving amount.

26. An apparatus according to claim 25, wherein the optical portion comprises means for changing the focal length by varying the optical power.

27. An apparatus according to claim 25, wherein the optical portion is disposed in the forward direction of the image shake prevention device on an optical axis.

28. An apparatus according to claim 23, wherein said setting means comprises means for changing the driving amount in accordance with a focal length, and said regulation means comprises means for changing the output range in accordance with the driving amount changed by said setting means.

29. An apparatus according to claim 28, wherein said regulation means comprises means for changing the output range so that a range of the fluctuation of the optical equipment is substantially constant when said setting means changes the driving amount in accordance with the focal length, and wherein the image shake prevention device accommodates the range of the fluctuation of the optical equipment by means of an image shake prevention operation.

30. An apparatus according to claim 19, wherein said regulation means comprises means for restricting the output range of the image shake prevention device to a portion of a movable range of the image shake prevention device.

31. An apparatus according to claim 19, wherein the image shake prevention device comprises means for deflecting a light beam by moving in an optical path.

32. An apparatus according to claim 19, wherein the image shake prevention device comprises the fluctuation detection device.

33. An image shake prevention apparatus, comprising:

image shake prevention means for preventing image shake in accordance with an output of a fluctuation detection device which detects a fluctuation of an optical apparatus;

setting means for setting a driving amount of said image shake prevention means in accordance with the output of the fluctuation detection device; and regulation means for regulating an output range of the fluctuation detection device within which the image shake prevention means responds, said regulation means regulating the output range independently of the driving amount set by said setting means.

34. An apparatus according to claim 33, wherein said setting means comprises means for changing the driving amount in accordance with a focal length, and said regulation means comprises means for changing the output range in accordance with a change in the driving amount set by said setting means.

35. An apparatus according to claim 34, wherein said setting means comprises means for making the driving amount smaller in accordance with the focal length being shortened, and said regulation means comprises means for making the output range smaller in accordance with said setting means making the driving amount smaller.

36. An apparatus according to claim 33, wherein said setting means comprises means for changing the driving amount in accordance with a change in a correspondence relationship between a fluctuation amount of an optical equipment and an image shake amount caused by the fluctuation amount, and said regulation means comprises means for changing the output range in accordance with a change of the driving amount by the setting means.

37. An apparatus according to claim 36, wherein said regulation means comprises means for changing the output range so that a range of the fluctuation of the optical equipment is substantially constant when said setting means changes the driving amount in accordance with a change of the correspondence relationship, and wherein the image shake prevention means accommodates the range of the fluctuation by means of an image shake prevention operation.

38. An apparatus for use with an image shake prevention device which prevents an image shake in accordance with an output of a fluctuation detection device which detects a fluctuation of an optical apparatus, comprising:

setting means for setting a driving amount of the image shake prevention device in accordance with the output of the fluctuation detection device; and regulation means for regulating an output range of the fluctuation detection device within which the image shake prevention device responds, said regulation means regulating the output range independently of the driving amount set by said setting means.

39. An image shake prevention apparatus, comprising:

image shake prevention means for preventing an image shake in accordance with an output of a fluctuation detection device which detects a fluctuation of an optical apparatus;

setting means for setting a driving amount of said image shake prevention means in accordance with the output of the fluctuation detection device; and regulation means for regulating an output range of the fluctuation detection device within which the image shake prevention device responds, said regulation means regulating the output range independently of the driving amount set by said setting means.

40. An optical apparatus having an image shake prevention function, said apparatus comprising:

an optical system for forming an image of an object;

a driving signal output device which generates a driving signal based on an output of an image shake detection device which detects an image shake;

an image shake prevention device which prevents image shake in accordance with said driving signal;

an optical condition detection device which detects an image forming condition of the optical system;

first varying means for changing a driving signal in accordance with an output of said optical condition detection device; and second varying means for changing a driving displacement range of said image shake prevention device in accordance with the output of said optical condition detection device.

41. An apparatus according to claim 40, wherein said optical system includes means for varying a focal length, and said optical condition detection device includes means for detecting said focal length.

42. An apparatus according to claim 40, wherein said optical system includes means for varying a photographing magnification, and said optical condition detection device includes means for detecting said photographing magnification.

43. An apparatus according to claim 40, wherein said driving signal output device includes means for generating said driving signal by performing a predetermined calculation used with the output of said image shake detection device.

44. An apparatus according to claim 43, wherein said first varying means includes means for varying a parameter used with said calculation.

45. An apparatus according to claim 40, wherein said image shape prevention device includes correction optical means and a driving device for driving said correction optical means in accordance with said driving signal.

46. An apparatus according to claim 45, wherein second varying means includes restriction means for setting an upper limit value of said driving signal input to said driving device and means for varying said upper limit value in accordance with the output of said optical condition detection device.

47. An apparatus according to claim 46, wherein said restriction means includes means for determining whether said driving signal is greater than said upper limit value, and means for restricting an input of said driving signal to said driving device in accordance with a determination that said driving signal is greater than said upper limit value.

48. An apparatus according to claim 47, wherein said restriction means includes means for inputting a retained signal indicating a predetermined value to said driving device in accordance with the determination that said driving signal is greater than said upper limit value.

49. An apparatus according to claim 47, wherein said restriction means includes means for varying a detection character of said image shake detection device in accordance with the determination that said driving signal is greater than said upper limit value.

50. An apparatus according to claim 47, wherein said restriction means includes means for determining whether an output of said image shake detection device for inputting said driving signal output device is greater than a predetermined value.

51. An apparatus according to claim 50, wherein said restriction means includes means for inhibiting a driving signal generating operation of said driving signal output device used with the output of said image shake detection device in accordance with the determination that the output of said image shake detection device for inputting said driving signal output device is greater than a predetermined value.

52. An apparatus according to claim 47, wherein said restriction means includes means for determining whether said driving signal generated by said driving signal output device is greater than a predetermine value.

53. An apparatus according to claim 40, wherein said image shake detection device includes means for detecting the vibration of an apparatus.

\* \* \* \* \*

UNITED STATES PATENT AND TRADEMARK OFFICE
CERTIFICATE OF CORRECTION

PATENT NO.  : 5,845,156

DATED       : December 1, 1998

INVENTOR(S) : ICHIRO ONUKI

It is certified that error appears in the above-identified patent and that said Letters Patent is hereby corrected as shown below:

In the drawings, FIG.1 should read --MTRI--

COLUMN 2,
Line 11, "deviationd$_{IM}$" should read --deviation d$_{IM}$--; and
Line 16, "d$_{Im}$ = S$_d$.d$_L$" should read --d$_{IM}$ = S$_d$d$_L$--.

COLUMN 3,
Line 31, "No. 4-86735proposed" should read
--No. 4-86735 proposed--.

COLUMN 12,
Line 9, "suffices" should read --suffixes--.

COLUMN 14,
Line 47, "$\theta_f=\theta_{Tele}\{1-\beta+\beta(F_{Tele}/f)\}$" should read
--$\theta_f=\theta_{Tele}\{1-\alpha+\alpha(f_{Tele}/f)\}$--;
Line 51, "$\beta$" should read --$\alpha$--; and
Line 54, "$\beta$="0.2"," should read --$\alpha$="0.2",--.

Column 20,
Line 65, "0$_1$" should read --$\theta_1$--.

Column 21,
Line 55, "$\theta'_o$." should read --$\theta'_o$.--.

UNITED STATES PATENT AND TRADEMARK OFFICE
CERTIFICATE OF CORRECTION

PATENT NO. : 5,845,156

DATED : December 1, 1998

INVENTOR(S) : ICHIRO ONUKI

It is certified that error appears in the above-identified patent and that said Letters Patent is hereby corrected as shown below:

COLUMN 23,
Line 3, "atthe" should read --at the--;
Line 6, ""$\theta^{of}=\theta^{oT}$"" should read --"$\theta_{of}=\theta_{oT}$"--;
Line 10, "$\theta^{2f}=\theta^{2T}\{1-\gamma+\gamma.(f_{Tele}/f)\}$" should read --$\theta_{2f}=\theta_{2T}\{1-\gamma+\gamma.(f_{Tele}/f)\}$--;
Line 13, "$\theta^{2T}$:" should read --$\theta_{2T}$:--;
Line 15, "$\theta^{2f}$:" should read --$\theta_{2f}$:--;
Line 17, $\theta^{2f}=\theta^{2T}$"" should read --$\theta_{2f}=\theta_{2T}$"--;
Line 18, ""$\theta^{2f}=1.6O_{2T}$"" should read --$\theta_{2f}=1.6O_{2T}$"--, and "large" should read --larger--;
Line 35, "$|\theta_p|$is" should read --$|\theta_p|$ is--;
Line 48, ""$|\theta_p|\geq\theta^{2f}$"" should read --"$|\theta_p|\geq\theta_{2f}$",--; and
Line 61, "$\theta^{2f}$" should read --$\theta_{2f}$--.

COLUMN 26,
Line 63, "$|d_y$" should read --$|d_y|$--.

COLUMN 30,
Line 48, "comprises" should read --comprises means--.

COLUMN 31,
Line 18, "stabilizing" should read --stabilizing means--; and
Line 49, "directions;" should read --directions; and--.

UNITED STATES PATENT AND TRADEMARK OFFICE
CERTIFICATE OF CORRECTION

PATENT NO. : 5,845,156

DATED : December 1, 1998

INVENTOR(S) : ICHIRO ONUKI

It is certified that error appears in the above-identified patent and that said Letters Patent is hereby corrected as shown below:

COLUMN 34,
Line 59, "shape" should read --shake--; and
Line 62, "second" should read --said second--.

FIGURE 1,
"MTR" should read --MTRI--.

Signed and Sealed this

Thirteenth Day of July, 1999

*Attest:*

Q. TODD DICKINSON

*Attesting Officer*  Acting Commissioner of Patents and Trademarks